US009292685B2

(12) United States Patent
Gupta et al.

(10) Patent No.: US 9,292,685 B2
(45) Date of Patent: Mar. 22, 2016

(54) TECHNIQUES FOR AUTONOMIC REVERTING TO BEHAVIORAL CHECKPOINTS

(71) Applicant: QUALCOMM Incorporated, San Diego, CA (US)

(72) Inventors: Rajarshi Gupta, Sunnyvale, CA (US); Nayeem Islam, Palo Alto, CA (US); Saumitra Das, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 13/747,115

(22) Filed: Jan. 22, 2013

(65) Prior Publication Data

US 2013/0305101 A1 Nov. 14, 2013

Related U.S. Application Data

(60) Provisional application No. 61/646,590, filed on May 14, 2012, provisional application No. 61/683,274, filed on Aug. 15, 2012.

(51) Int. Cl.
*G06F 11/00* (2006.01)
*G06F 21/55* (2013.01)
(Continued)

(52) U.S. Cl.
CPC .......... *G06F 21/552* (2013.01); *G06F 11/1433* (2013.01); *G06F 11/1458* (2013.01);
(Continued)

(58) Field of Classification Search
CPC ........ G06F 11/1433; G06F 11/1446–11/1474; G06F 12/006; G06F 21/552; G06F 21/56; G06F 21/554; G06F 11/3006; G06F 11/3082; G06F 11/3466; G06F 11/3409; H04W 52/0251; H04W 24/08; H04W 52/0258; H04W 12/12; H04W 88/02; H04L 63/1433
See application file for complete search history.

(56) References Cited

U.S. PATENT DOCUMENTS 5,870,735 A 2/1999 Agrawal et al.
6,532,541 B1 3/2003 Chang et al.
(Continued)

FOREIGN PATENT DOCUMENTS

CN 102591696 A 7/2012
EP 1182552 A2 2/2002
(Continued)

OTHER PUBLICATIONS

Chekina L., et al., "Detection of deviations in mobile applications network behavior", arXiv:1208.0564v2, Aug. 5, 2012, 5 pages, XP055107301, Retrieved from the Internet: URL: http://arxiv.org/abs/1208.0564v2 [retrieved on Nov. 1, 2013] the whole document.
(Continued)

*Primary Examiner* — Jason Bryan
(74) *Attorney, Agent, or Firm* — Shirin Tefagh; Joseph Agusta

(57) ABSTRACT

Aspect methods, systems and devices may be configured to create/capture checkpoints without significantly impacting the performance, power consumption, or responsiveness of the mobile device. An observer module of the mobile device may instrument or coordinate various application programming interfaces (APIs) at various levels of the mobile device system and constantly monitor the mobile device (via a low power process, background processes, etc.) to identify the normal operation patterns of the mobile device and/or to identify behaviors that are not consistent with previously computed normal operation patterns. The mobile device may store mobile device state information in a memory as a stored checkpoint when it determines that the mobile device behaviors are consistent with normal operation patterns, and upload a previously stored checkpoint to a backup storage system when it determines that the mobile device behaviors are not consistent with normal operation patterns.

32 Claims, 9 Drawing Sheets

(51) Int. Cl.
| | |
|---|---|
| *G06F 21/56* | (2013.01) |
| *G06F 11/14* | (2006.01) |
| *G06F 11/30* | (2006.01) |
| *H04W 52/02* | (2009.01) |
| *H04W 24/08* | (2009.01) |
| *G06F 11/34* | (2006.01) |
| *H04W 12/12* | (2009.01) |
| *H04W 88/02* | (2009.01) |
| *H04L 29/06* | (2006.01) |

(52) U.S. Cl.
CPC ........ *G06F11/3006* (2013.01); *G06F 11/3082* (2013.01); *G06F 11/3466* (2013.01); *G06F 21/554* (2013.01); *G06F 21/56* (2013.01); *H04W 24/08* (2013.01); *H04W 52/0251* (2013.01); *H04W 52/0258* (2013.01); *G06F 11/3409* (2013.01); *G06F 11/3476* (2013.01); *G06F 2201/86* (2013.01); *H04L 63/1433* (2013.01); *H04W 12/12* (2013.01); *H04W 88/02* (2013.01); *Y02B 60/165* (2013.01)

(56) References Cited

U.S. PATENT DOCUMENTS

| | | | |
|---|---|---|---|
| 6,643,802 | B1 | 11/2003 | Frost et al. |
| 7,051,327 | B1* | 5/2006 | Milius et al. ................... 717/177 |
| 7,401,359 | B2 | 7/2008 | Gartside et al. |
| 7,559,053 | B2 | 7/2009 | Krassovsky et al. |
| 7,561,877 | B2 | 7/2009 | Cassett et al. |
| 7,571,478 | B2 | 8/2009 | Munson et al. |
| 7,600,014 | B2 | 10/2009 | Russell et al. |
| 7,650,317 | B2 | 1/2010 | Basu et al. |
| 7,676,573 | B2 | 3/2010 | Herzog et al. |
| 7,694,150 | B1 | 4/2010 | Kirby |
| 7,757,292 | B1 | 7/2010 | Renert et al. |
| 7,774,599 | B2 | 8/2010 | Guo et al. |
| 7,831,237 | B2 | 11/2010 | Passarella et al. |
| 7,831,248 | B2 | 11/2010 | Lee |
| 7,849,360 | B2 | 12/2010 | Largman et al. |
| 7,877,621 | B2 | 1/2011 | Jacoby et al. |
| 7,881,291 | B2 | 2/2011 | Grah |
| 7,890,443 | B2 | 2/2011 | Zhang et al. |
| 7,945,955 | B2 | 5/2011 | Katkar |
| 8,045,958 | B2 | 10/2011 | Kahandaliyanage |
| 8,087,067 | B2 | 12/2011 | Mahaffey et al. |
| 8,095,964 | B1 | 1/2012 | Zhong et al. |
| 8,161,548 | B1 | 4/2012 | Wan |
| 8,201,244 | B2 | 6/2012 | Sun et al. |
| 8,201,249 | B2 | 6/2012 | McCallam |
| 8,225,093 | B2 | 7/2012 | Fok et al. |
| 8,245,295 | B2 | 8/2012 | Park et al. |
| 8,245,315 | B2 | 8/2012 | Cassett et al. |
| 8,266,698 | B1 | 9/2012 | Seshardi et al. |
| 8,311,956 | B2 | 11/2012 | Sen et al. |
| 8,312,545 | B2 | 11/2012 | Tuvell et al. |
| 8,321,941 | B2 | 11/2012 | Tuvell et al. |
| 8,331,987 | B2 | 12/2012 | Rosenblatt |
| 8,332,945 | B2 | 12/2012 | Kim et al. |
| 8,347,386 | B2 | 1/2013 | Mahaffey et al. |
| 8,397,301 | B2 | 3/2013 | Hering et al. |
| 8,443,439 | B2 | 5/2013 | Lamastra et al. |
| 8,458,809 | B2 | 6/2013 | Adams et al. |
| 8,516,584 | B2 | 8/2013 | Moskovitch et al. |
| 8,533,844 | B2 | 9/2013 | Mahaffey et al. |
| 8,554,912 | B1 | 10/2013 | Reeves et al. |
| 8,694,744 | B1* | 4/2014 | Raj et al. ........................ 711/162 |
| 8,701,192 | B1 | 4/2014 | Glick et al. |
| 8,762,298 | B1 | 6/2014 | Ranjan et al. |
| 8,763,127 | B2 | 6/2014 | Yao et al. |
| 8,775,333 | B1 | 7/2014 | Zahn |
| 2002/0099756 | A1 | 7/2002 | Catthoor et al. |
| 2004/0039924 | A1 | 2/2004 | Baldwin et al. |
| 2004/0068721 | A1* | 4/2004 | O'Neill et al. ................. 717/168 |
| 2004/0083366 | A1 | 4/2004 | Nachenberg et al. |
| 2004/0221163 | A1 | 11/2004 | Jorgensen et al. |
| 2005/0144480 | A1 | 6/2005 | Kim et al. |
| 2006/0026464 | A1 | 2/2006 | Atkin et al. |
| 2006/0085854 | A1 | 4/2006 | Agrawal et al. |
| 2006/0288209 | A1 | 12/2006 | Vogler |
| 2007/0006304 | A1 | 1/2007 | Kramer et al. |
| 2007/0136455 | A1 | 6/2007 | Lee et al. |
| 2007/0192866 | A1 | 8/2007 | Sagoo et al. |
| 2007/0199060 | A1 | 8/2007 | Touboul |
| 2007/0220327 | A1* | 9/2007 | Ruscio et al. ................... 714/17 |
| 2007/0283170 | A1 | 12/2007 | Yami et al. |
| 2007/0287387 | A1 | 12/2007 | Keum et al. |
| 2007/0294768 | A1 | 12/2007 | Moskovitch et al. |
| 2008/0016339 | A1 | 1/2008 | Shukla |
| 2008/0026464 | A1 | 1/2008 | Borenstein et al. |
| 2008/0046755 | A1 | 2/2008 | Hayes |
| 2008/0047009 | A1 | 2/2008 | Overcash et al. |
| 2008/0086773 | A1 | 4/2008 | Tuvell et al. |
| 2008/0109495 | A1* | 5/2008 | Herberger et al. ............ 707/204 |
| 2008/0140821 | A1 | 6/2008 | Tada |
| 2008/0162686 | A1 | 7/2008 | Kalaboukis et al. |
| 2008/0163382 | A1 | 7/2008 | Blue et al. |
| 2008/0172746 | A1 | 7/2008 | Lotter et al. |
| 2008/0228429 | A1 | 9/2008 | Huang et al. |
| 2009/0019546 | A1 | 1/2009 | Park et al. |
| 2009/0019551 | A1 | 1/2009 | Haga et al. |
| 2009/0199296 | A1 | 8/2009 | Xie et al. |
| 2009/0217078 | A1 | 8/2009 | Cassett et al. |
| 2009/0239531 | A1 | 9/2009 | Andreasen et al. |
| 2009/0287618 | A1 | 11/2009 | Weinberger et al. |
| 2009/0288080 | A1 | 11/2009 | Partridge |
| 2009/0288164 | A1 | 11/2009 | Adelstein et al. |
| 2009/0300765 | A1 | 12/2009 | Moskovitch et al. |
| 2009/0327168 | A1 | 12/2009 | Weinberger et al. |
| 2010/0011029 | A1 | 1/2010 | Niemel |
| 2010/0036786 | A1 | 2/2010 | Pujara |
| 2010/0082513 | A1 | 4/2010 | Liu |
| 2010/0105404 | A1 | 4/2010 | Palanki et al. |
| 2010/0107257 | A1 | 4/2010 | Ollmann |
| 2010/0128125 | A1 | 5/2010 | Warzelhan |
| 2010/0153371 | A1 | 6/2010 | Singh |
| 2010/0154032 | A1 | 6/2010 | Ollmann |
| 2010/0175135 | A1 | 7/2010 | Kandek et al. |
| 2010/0192201 | A1 | 7/2010 | Shimoni et al. |
| 2010/0241974 | A1 | 9/2010 | Rubin et al. |
| 2010/0251340 | A1 | 9/2010 | Martin et al. |
| 2010/0262693 | A1 | 10/2010 | Stokes et al. |
| 2010/0296496 | A1 | 11/2010 | Sinha et al. |
| 2010/0299292 | A1 | 11/2010 | Collazo |
| 2010/0313269 | A1 | 12/2010 | Ye |
| 2011/0004935 | A1 | 1/2011 | Moffie et al. |
| 2011/0013528 | A1 | 1/2011 | Chen |
| 2011/0023118 | A1 | 1/2011 | Wright |
| 2011/0060948 | A1 | 3/2011 | Beebe |
| 2011/0105096 | A1 | 5/2011 | Dods et al. |
| 2011/0145920 | A1 | 6/2011 | Mahaffey et al. |
| 2011/0161452 | A1 | 6/2011 | Poornachandran et al. |
| 2011/0219449 | A1 | 9/2011 | St. Neitzel et al. |
| 2011/0264764 | A1* | 10/2011 | Kewalramani et al. ....... 709/217 |
| 2011/0286437 | A1 | 11/2011 | Austin et al. |
| 2011/0302654 | A1 | 12/2011 | Miettinen |
| 2011/0302656 | A1 | 12/2011 | El-Moussa |
| 2011/0307233 | A1 | 12/2011 | Tseng et al. |
| 2012/0016633 | A1 | 1/2012 | Wittenstein et al. |
| 2012/0051228 | A1 | 3/2012 | Shuman et al. |
| 2012/0060219 | A1 | 3/2012 | Larsson et al. |
| 2012/0096539 | A1 | 4/2012 | Hu et al. |
| 2012/0110174 | A1 | 5/2012 | Wootton et al. |
| 2012/0131674 | A1 | 5/2012 | Wittenschlaeger |
| 2012/0151062 | A1 | 6/2012 | Gusev et al. |
| 2012/0159633 | A1 | 6/2012 | Grachev et al. |
| 2012/0167162 | A1 | 6/2012 | Raleigh et al. |
| 2012/0167217 | A1 | 6/2012 | McReynolds |
| 2012/0167218 | A1 | 6/2012 | Poornachandran et al. |
| 2012/0180126 | A1 | 7/2012 | Liu et al. |
| 2012/0207046 | A1 | 8/2012 | Di Pietro et al. |
| 2012/0210423 | A1 | 8/2012 | Friedrichs et al. |
| 2012/0227105 | A1 | 9/2012 | Friedrichs et al. |

(56) References Cited

U.S. PATENT DOCUMENTS

| | | | |
|---|---|---|---|
| 2012/0233694 | A1 | 9/2012 | Baliga et al. |
| 2012/0245481 | A1 | 9/2012 | Blanco et al. |
| 2012/0254333 | A1 | 10/2012 | Chandramouli et al. |
| 2012/0270611 | A1 | 10/2012 | Choi et al. |
| 2012/0311366 | A1* | 12/2012 | Alsina et al. ............... 713/340 |
| 2012/0311708 | A1 | 12/2012 | Agarwal et al. |
| 2012/0317306 | A1 | 12/2012 | Radinsky et al. |
| 2012/0321175 | A1 | 12/2012 | Hedau et al. |
| 2012/0323853 | A1 | 12/2012 | Fries et al. |
| 2013/0014262 | A1 | 1/2013 | Lee et al. |
| 2013/0031600 | A1 | 1/2013 | Luna et al. |
| 2013/0066815 | A1 | 3/2013 | Oka et al. |
| 2013/0073983 | A1 | 3/2013 | Rasmussen et al. |
| 2013/0097706 | A1 | 4/2013 | Titonis et al. |
| 2013/0151848 | A1 | 6/2013 | Baumann et al. |
| 2013/0167231 | A1 | 6/2013 | Raman et al. |
| 2013/0179991 | A1 | 7/2013 | White et al. |
| 2013/0204812 | A1 | 8/2013 | Sterzing et al. |
| 2013/0247187 | A1 | 9/2013 | Hsiao et al. |
| 2013/0267201 | A1 | 10/2013 | Gupta et al. |
| 2013/0303154 | A1 | 11/2013 | Gupta et al. |
| 2013/0303159 | A1 | 11/2013 | Gathala et al. |
| 2013/0304676 | A1 | 11/2013 | Gupta et al. |
| 2013/0304677 | A1 | 11/2013 | Gupta et al. |
| 2013/0304869 | A1 | 11/2013 | Gupta et al. |
| 2013/0305358 | A1 | 11/2013 | Gathala et al. |
| 2013/0305359 | A1 | 11/2013 | Gathala et al. |
| 2014/0007183 | A1 | 1/2014 | Qureshi et al. |
| 2014/0051432 | A1 | 2/2014 | Gupta et al. |
| 2014/0053260 | A1 | 2/2014 | Gupta et al. |
| 2014/0053261 | A1 | 2/2014 | Gupta et al. |
| 2014/0096246 | A1 | 4/2014 | Morrissey et al. |
| 2014/0150100 | A1 | 5/2014 | Gupta et al. |
| 2014/0187177 | A1 | 7/2014 | Sridhara et al. |
| 2014/0188781 | A1 | 7/2014 | Fawaz |
| 2014/0205099 | A1 | 7/2014 | Christodorescu et al. |
| 2014/0237595 | A1 | 8/2014 | Sridhara et al. |
| 2014/0245306 | A1 | 8/2014 | Gathala |
| 2014/0279745 | A1 | 9/2014 | Esponda et al. |
| 2014/0317734 | A1 | 10/2014 | Valencia et al. |
| 2014/0337862 | A1 | 11/2014 | Valencia et al. |
| 2015/0148109 | A1 | 5/2015 | Gupta et al. |
| 2015/0356462 | A1 | 12/2015 | Fawaz et al. |

FOREIGN PATENT DOCUMENTS

| | | |
|---|---|---|
| EP | 1983686 A1 | 10/2008 |
| EP | 2182458 A1 | 5/2010 |
| EP | 2326057 A1 | 5/2011 |
| EP | 2406717 A1 | 1/2012 |
| EP | 2680182 A1 | 1/2014 |
| TW | 200937198 A | 9/2009 |
| TW | 201239618 A | 10/2012 |
| WO | 2010048502 | 4/2010 |
| WO | 2010126416 A1 | 11/2010 |
| WO | 2011147580 A1 | 12/2011 |
| WO | 2013016692 | 1/2013 |
| WO | WO-2013080096 A1 | 6/2013 |
| WO | 2013172865 A1 | 11/2013 |
| WO | 2013173003 A2 | 11/2013 |
| WO | 2013173044 A2 | 11/2013 |

OTHER PUBLICATIONS

Folino G., et al., "An ensemble-based evolutionary framework for coping with distributed intrusion detection", Genetic Programming and Evolvable Machines, vol. 11, No. 2, Feb. 7, 2010, pp. 131-146, XP019789345, DOI: 10.1007/S10710-010-9101-6 the whole document.

Gao J., et al., "Adaptive distributed intrusion detection using parametric model", Proceedings of the 2009 IEEE/WIC/ACM International Joint Conferences on Web Intelligence and Intelligent Agent Technologies (WI-IAT'09), vol. 1, Sep. 15, 2009, pp. 675-678, XP055107983, DOI: 10.1109/WI-AT.2009.113 the whole document.

Jean E., et al., "Boosting-based distributed and adaptive security-monitoring through agent collaboration", Proceedings of the 2007 IEEE/WIC/ACM International Conferences on Web Intelligence and Intelligent Agent Technology Workshops (WI-IATW'07), Nov. 5, 2007, pp. 516-520, XP031200055, DOI: 10.1109/WI-IATW.2007.52 the whole document.

Kachirski O., et al., "Effective Intrusion Detection Using Windows Sensors in Wireless Ad Hoc Networks", IEEE Proceedings of the 36th Hawaii International Conference on System Sciences, 2002, 8 pages.

Kirda E., et al., "Behavior-Based Spyware Detection", 15th USENIX Security Symposium, 2002, pp. 273-288.

Miluzzo E., et al., "Vision: mClouds—computing on clouds of mobile devices", Proceedings of the 3rd ACM Workshop on Mobile Cloud Computing and Services (MCS'12), Jun. 25, 2012, pp. 9-14, XP055107956, DOI: 10.1145/2307849.2307854 the whole document.

Schmidt A.D., et al., "Static analysis of executables for collaborative malware detection on android", Proceedings of the 2009 IEEE International Conference on Communications (ICC'09), Jun. 14, 2009, 3 Pages, XP031506460, DOI: 10.1109/ICC.2009.5199486 the whole document.

Shabtai A., et al., "a Andromalya: a behavioral malware detection framework for android devices", Journal of Intelligent Information Systems, Kluwer Academic Publishers, BO, vol. 38, No. 1, Jan. 6, 2011, pp. 161-190, XP019998836, ISSN: 1573-7675, DOI: 10.1007/S10844-010-0148-X paragraph [5.3.1]—paragraph [5.3.4].

Shamili A.S., et al., "Malware detection on mobile devices using distributed machine learning", Proceedings of the 20th International Conference on Pattern Recognition (ICPR'10), Aug. 23, 2010, pp. 4348-4351, XP031772702, DOI: 10.1109/ICPR.2010.1057 the whole document.

Tabish S.M., "Malware detection using statistical analysis of byte-level file content", Proceedings of the ACM SIGKDD Workshop on Cybersecurity and Intelligence Informatics (CSI-KDD'09), Jun. 28, 2009, pp. 23-31, XP055107225, DOI: 10.1145/1599272.1599278 the whole document.

International Search Report and Written Opinion—PCT/US2013/023246—ISA/EPO—Jul. 16, 2013.

Caruana, et al., "An Empirical Comparison of Supervised Learning Algorithms", ICML, 2006, 8 pgs.

Caruna, et al., "An Empirical Evaluation of Supervised Learning in High Dimensions", ICML, 2008, 8 pgs.

Co-pending U.S. Appl. No. 13/558,527, filed Jul. 26, 2012.

Shabtai A., et al., "Dectecting unknown malicious code by applying classification techniques on OpCode patterns," Security Informatics a Springer Open Journal, 2012, vol. 1 (1), pp. 1-22.

Hu W., et al., "AdaBoost-Based Algorithm for Network Intrusion Detection," IEEE Transactions on Systems, Man, and Cybernetics, Part B: Cybernetics, Apr. 2008, vol. 38 (2), pp. 577-583.

Lu Y. B., et al., "Using Multi-Feature and Classifier Ensembles to Improve Malware Detection", Journal of Chung Cheng Institute of Technology, vol. 39, No. 2, Nov. 2010, pp. 57-72, XP55086345, ISSN: 0255-6030.

Natesan P. et al., "Design of Two Stage Filter Using Enhanced Adaboost for Improving Attack Detection Rates in Network Intrusion Detection", International Journal of Computer Science and Information Technology & Security, vol. 2, No. 2, Apr. 2012, pp. 349-358, XP55086347, ISSN: 2249-955.

Shabtai A., "Malware Detection on Mobile Devices," Eleventh International Conference on Mobile Data Management, IEEE Computer Society, 2010, pp. 289-290.

Sheen S., et al., "Network Intrusion Detection using Feature Selection and Decision tree classifier," TENCON—IEEE Region 10 Conference, 2008, pp. 1-4.

Abu-Nimeh S., "Phishing detection using distributed Bayesian additive regression trees", Dec. 13, 2008, Southern Methodist University, 28 pages, XP055107295, ISBN: 9780549908630 chapters 2, 4, 6 and 8.

De Stefano C., et al., "Pruning GP-Based Classifier Ensembles by Bayesian Networks," Lecture Notes in Computer Science, Sep. 1, 2012, pp. 236-245, XP047016355, DOI: 10.1007/978-3-642-32937-1_24, Sections 1 and 2.

(56) References Cited

OTHER PUBLICATIONS

Qin F., "System Support for Improving Software Dependability During Production Runs," Urbana, Illinois, 1998, pp. 1-116.

Saller K., et al., "Reducing Feature Models to Improve Runtime Adaptivity on Resource Limited Devices," Proceedings of the 16th International Software Product Line Conference (SPLC), Sep. 2, 2012, vol. 11, pp. 135-142, XP058009814, DOI: 10.1145/2364412.2364435, Section 5.

Wang Y-M., et al., "Strider: A Black-Box, State-based Approach to Change and Configuration Management and Support," 2003 LISA XVII—Oct. 26-31, 2003—San Diego, CA, pp. 165-178.

Burguera I., et al., "Crowdroid", Security and Privacy in Smartphones and Mobile Devices, ACM, 2 Penn Plaza, Suite 701 New York NY 10121-0701 USA, Oct. 17, 2011, XP058005976, DOI: 10.1145/2046614.2046619 ISBN: 978-1-4503-1000-0, pp. 15-26.

Gavin McWilliams: "Malware detection methods for fixed and mobile networks", Centre for Secure Information Technologies—Queen's University Belfast, Jan. 23, 2013, pp. 1-21, XP017577639, [retrieved on Jan. 23, 2013] the whole document.

Jarle Kittilsen: "Detecting malicious PDF documents", Dec. 1, 2011, pp. 1-112, XP055947997, Gjovik, Norway Retrieved from the Internet: URL:http:f/brage.bibsys.no/hig/retrieve/21 28/Jarle Kittilsen.pdf [retrieved on Dec. 14, 2012] the whole document.

Kaspersky Endpoint Security 8 for Smartphone Program Version 8.0, Updated on Feb. 8, 2012.

Kolter J.Z., et al., "Learning to Detect Malicious Executables in the Wild", ACM Knowl. Discovery and Data Mining (KDD), 2004, pp. 470-478.

Schmidt A.D., et al., "Monitoring Smartphones for Anomaly Detection", Mobile Networks and Applications, vol. 14, No. 1, Feb. 1, 2009, pp. 92-106, XP055115882, ISSN: 1383-469X, DOI:10.1007/s11036-008-0113-x.

Yerima.S.Y. et al., "A New Android Malware Detection Approach Using Bayesian Classification", 2014 IEEE 28th International Conference on advanced Information Networking and Applications, IEEE, Mar. 25, 2013, pp. 121-128, XP032678454, ISSN: 1550-445X, DOI: 10.1109/AINA.2013.88 ISBN: 978-1-4673-5550-6 [retrived on Jun. 13, 2013] the whole document.

Lee., et al., "A Data Mining Framework for Building Intrusion Detection Models", Published in: Proceedings of the 1999 IEEE Symposium on Security and Privacy, 1999. Backspace, Conference Location: Oakland, CA, Date of Conference: 1999, pp. 120-132, Meeting Date: May 9-12, 1999.

Tan, P.N., et al., "Introduction to data mining," Library of Congress, 2006, Chapter 4.

Voulgaris., et al., "Dimensionality Reduction for Feature and Pattern Selection in Classification Problems", Published in:, 2008. ICCGI '08. The Third International Multi-Conference on Computing in the Global Information Technology, Conference Location: Athens Date of Conference: Jul. 27, 2008-Aug. 1, 2008, pp. 160-165.

* cited by examiner

US 9,292,685 B2

TECHNIQUES FOR AUTONOMIC REVERTING TO BEHAVIORAL CHECKPOINTS

RELATED APPLICATIONS

This application claims the benefit of priority to U.S. Provisional Patent Application No. 61/646,590 entitled "System, Apparatus and Method for Adaptive Observation of Mobile Device Behavior" filed May 14, 2012; and U.S. Provisional Application No. 61/683,274, entitled "System, Apparatus and Method for Adaptive Observation of Mobile Device Behavior" filed Aug. 15, 2012, the entire contents of both which are hereby incorporated by reference for all purposes.

BACKGROUND

Cellular and wireless communication technologies have seen explosive growth over the past several years. This growth has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. This complexity has created new opportunities for malicious software, software conflicts, hardware faults, and other similar errors or phenomena to negatively impact a mobile device's long-term and continued performance and power utilization levels. Accordingly, correcting the conditions and/or mobile device behaviors that may negatively impact the mobile device's long term and continued performance and power utilization levels is beneficial to consumers.

SUMMARY

The various aspects include methods of checkpointing in a mobile device, including observing mobile device behaviors over a period of time to recognize mobile device behaviors that are inconsistent with normal operation patterns, storing mobile device state information in a memory as a stored checkpoint when it is determined that the mobile device behaviors are consistent with normal operation patterns, and uploading the stored checkpoint to a backup storage system in response to determining that the mobile device behaviors are not consistent with normal operation patterns. In an aspect, storing mobile device state information in a memory as a stored checkpoint may include storing state information for restoring the mobile device as the stored checkpoint. In a further aspect, storing mobile device state information in a memory as a stored checkpoint may include storing state information for restoring a specific software application as the stored checkpoint. In a further aspect, the method may include determining whether a software application is associated with a signature, and generating a checkpoint trigger in response to determining that the software application is not associated with a signature. In a further aspect, uploading the stored checkpoint to a backup storage system in response to determining that the mobile device behaviors are not consistent with normal operation patterns may include uploading the stored checkpoint in response detecting a trigger generated in response to installing a software application update on the mobile device. In a further aspect, uploading the stored checkpoint to a backup storage system may include uploading the stored checkpoint to a server in a cloud service provider network. In a further aspect, the method may include determining whether the mobile device is associated with a WiFi access point, wherein uploading the stored checkpoint to a backup storage system may include uploading the stored checkpoint to a network server in response to determining that the mobile device is associated with a WiFi access point. In a further aspect, the method may include determining whether the mobile device is connected to an external power source, wherein uploading the stored checkpoint to a backup storage system may include uploading the stored checkpoint to a network server in response to determining that the mobile device is connected to an external power source.

Further aspects include a computing device that may include means for observing mobile device behaviors over a period of time to recognize mobile device behaviors that are inconsistent with normal operation patterns, means for storing mobile device state information in a memory as a stored checkpoint when it is determined that the mobile device behaviors are consistent with normal operation patterns, and means for uploading the stored checkpoint to a backup storage system in response to determining that the mobile device behaviors are not consistent with normal operation patterns. In an aspect, means for storing mobile device state information in a memory as a stored checkpoint may include means for storing state information for restoring the mobile computing device as the stored checkpoint. In a further aspect, means for storing mobile device state information in a memory as a stored checkpoint may include means for storing state information for restoring a specific software application as the stored checkpoint. In a further aspect, the computing device may include means for determining whether a software application is associated with a signature, and means for generating a checkpoint trigger in response to determining that the software application is not associated with a signature. In a further aspect, means for uploading the stored checkpoint to a backup storage system in response to determining that the mobile device behaviors are not consistent with normal operation patterns may include means for uploading the stored checkpoint in response detecting a trigger generated in response to installing a software application update on the mobile computing device. In a further aspect, means for uploading the stored checkpoint to a backup storage system may include means for uploading the stored checkpoint to a server in a cloud service provider network. In a further aspect, the computing device may include means for determining whether the mobile computing device is associated with a WiFi access point, wherein means for uploading the stored checkpoint to a backup storage system may include means for uploading the stored checkpoint to a network server in response to determining that the mobile computing device is associated with a WiFi access point. In a further aspect, the computing device may include means for determining whether the mobile computing device is connected to an external power source, wherein means for uploading the stored checkpoint to a backup storage system may include means for uploading the stored checkpoint to a network server in response to determining that the mobile computing device is connected to an external power source.

Further aspects include a mobile computing device that may include a processor configured with processor-executable instructions to perform operations that may include observing mobile device behaviors over a period of time to recognize mobile device behaviors that are inconsistent with normal operation patterns, storing mobile device state information in a memory as a stored checkpoint when it is determined that the mobile device behaviors are consistent with normal operation patterns, and uploading the stored checkpoint to a backup storage system in response to determining that the mobile device behaviors are not consistent with normal operation patterns. In an aspect, the processor may be configured with processor-executable instructions to perform operations such that storing mobile device state information in a memory as a stored checkpoint may include storing state information for restoring the mobile computing device as the stored checkpoint. In a further aspect, the processor may be configured with processor-executable instructions to perform operations such that storing mobile device state information in a memory as a stored checkpoint may include storing state information for restoring a specific software application as the stored checkpoint. In a further aspect, the processor may be configured with processor-executable instructions to perform operations further including determining whether a software application is associated with a signature, and generating a checkpoint trigger in response to determining that the software application is not associated with a signature. In a further aspect, the processor may be configured with processor-executable instructions to perform operations such that uploading the stored checkpoint to a backup storage system in response to determining that the mobile device behaviors are not consistent with normal operation patterns may include uploading the stored checkpoint in response detecting a trigger generated in response to installing a software application update on the mobile computing device. In a further aspect, the processor may be configured with processor-executable instructions to perform operations such that uploading the stored checkpoint to a backup storage system may include uploading the stored checkpoint to a server in a cloud service provider network. In a further aspect, the processor may be configured with processor-executable instructions to perform operations further including determining whether the mobile computing device is associated with a WiFi access point, and the processor may be configured with processor-executable instructions to perform operations such that uploading the stored checkpoint to a backup storage system may include uploading the stored checkpoint to a network server in response to determining that the mobile computing device is associated with a WiFi access point. In a further aspect, the processor may be configured with processor-executable instructions to perform operations further including determining whether the mobile computing device is connected to an external power source, and the processor may be configured with processor-executable instructions to perform operations such that uploading the stored checkpoint to a backup storage system may include uploading the stored checkpoint to a network server in response to determining that the mobile computing device is connected to an external power source.

Further aspects include a non-transitory server-readable storage medium having stored thereon processor-executable instructions configured cause a mobile computing device to perform operations that may include observing mobile device behaviors over a period of time to recognize mobile device behaviors that are inconsistent with normal operation patterns, storing mobile device state information in a memory as a stored checkpoint when it is determined that the mobile device behaviors are consistent with normal operation patterns, and uploading the stored checkpoint to a backup storage system in response to determining that the mobile device behaviors are not consistent with normal operation patterns. In an aspect, the stored processor-executable software instructions may be configured to cause a processor to perform operations such that storing mobile device state information in a memory as a stored checkpoint may include storing state information for restoring the mobile device as the stored checkpoint. In a further aspect, the stored processor-executable software instructions may be configured to cause a processor to perform operations such that storing mobile device state information in a memory as a stored checkpoint may include storing state information for restoring a specific software application as the stored checkpoint. In a further aspect, the stored processor-executable software instructions may be configured to cause a processor to perform operations including determining whether a software application is associated with a signature, and generating a checkpoint trigger in response to determining that the software application is not associated with a signature. In a further aspect, the stored processor-executable software instructions may be configured to cause a processor to perform operations such that uploading the stored checkpoint to a backup storage system in response to determining that the mobile device behaviors are not consistent with normal operation patterns may include uploading the stored checkpoint in response detecting a trigger generated in response to installing a software application update on the mobile device. In a further aspect, the stored processor-executable software instructions may be configured to cause a processor to perform operations such that uploading the stored checkpoint to a backup storage system may include uploading the stored checkpoint to a server in a cloud service provider network. In a further aspect, the stored processor-executable software instructions may be configured to cause a processor to perform operations including determining whether the mobile device is associated with a WiFi access point, wherein uploading the stored checkpoint to a backup storage system may include uploading the stored checkpoint to a network server in response to determining that the mobile device is associated with a WiFi access point. In a further aspect, the stored processor-executable software instructions may be configured to cause a processor to perform operations including determining whether the mobile device is connected to an external power source, wherein uploading the stored checkpoint to a backup storage system may include uploading the stored checkpoint to a network server in response to determining that the mobile device is connected to an external power source.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
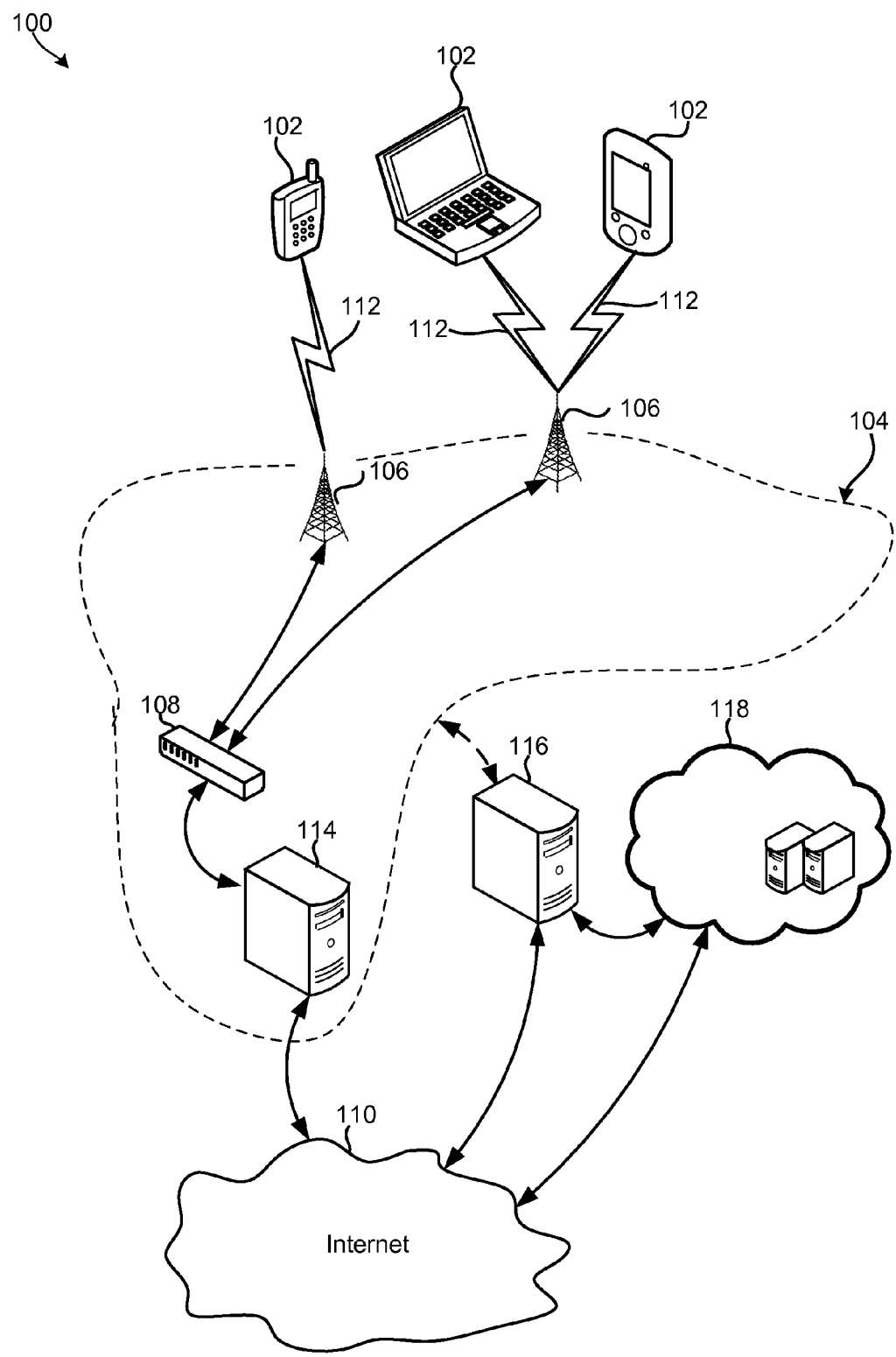
FIG. 1 is a communication system block diagram illustrating network components of an example telecommunication system suitable for use in the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for mobile computing devices, such as smartphones, which have limited resources and run on battery power, the aspects are generally useful in any electronic device that includes a processor and executes application programs.

The various aspects include methods, systems, and devices configured to create/capture checkpoints without consuming a significant amount or number of the mobile device's processing or battery resources, and without impacting the performance or responsiveness of the mobile device.

Various backup and recovery solutions exist for capturing and recording mobile device state information in a format that may be used to restore a mobile device to a previous operating state or condition. For example, "checkpointing" is a well-known fault tolerance technique that typically includes taking a snapshot of the current state of a computing system and storing the snapshot for later use in case of failure. A checkpoint may include a software image of the mobile device, as well as other state information, suitable for restoring the mobile device to a previous operating state or condition when necessary, such as in the event of a hardware failure, data corruption, viruses, etc. Each checkpoint may include a full backup image that includes all the data and state information available on mobile device at the time the checkpoint is created, or a partial or incremental backup image that includes only the data and state information that has changed since a previous checkpoint was captured or created.

Existing solutions for creating or capturing checkpoints typically require the execution of a power and computationally intensive process in the mobile device. Such conventional processing may consume many of the mobile device's processing and battery resources, slow or render the mobile device useless for extended periods of time, and otherwise degrade the user experience.

Generally, the performance and power efficiency of a mobile device degrade over time. Recently, anti-virus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile device, which may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time, such as when the performance degradation is not caused by viruses or malware. The term "performance degradation" is used herein to refer to a wide variety of undesirable mobile device operations and characteristics, such as longer processing times, lower battery life, loss of private data, malicious economic activity (e.g., sending unauthorized premium SMS message), operations relating to commandeering the mobile device or utilizing the phone for spying or botnet activities, etc. For these and other reasons, existing anti-virus, firewall, and encryption products do not provide adequate solutions for identifying the numerous factors that may contribute to a mobile device's degradation over time, for backing up the mobile device, for preventing mobile device degradation, or for efficiently restoring an aging mobile device to its original condition.

Mobile devices are resource constrained systems that have relatively limited processing, memory, and energy resources. Modern mobile devices are also complex systems, and there may be thousands of features/factors and billions of datapoints that require analysis to properly identify the cause or source of a mobile device's degradation. Due to these constraints, it is often not feasible to evaluate all the factors that may contribute to the degradation in performance and/or power utilization levels of the complex yet resource-constrained systems of modern mobile devices. Also due to these constraints, it typically not feasible to collect a large number of checkpoints or to capture checkpoints frequently as the collection and storage of each checkpoint may consume a significant amount or number of processing and power resources.

In addition, there are a large variety of factors that may contribute to the degradation in performance and power utilization levels of a mobile device over time, including poorly designed software applications, malware, viruses, fragmented memory, background processes, etc. Due to the number, variety, and complexity of these factors, existing backup and recovery solutions cannot adequately or intelligently determine when or how often a checkpoint should be captured, stored, or uploaded to a network server.

For these and other reasons, many existing solutions only support configuring the mobile device to capture checkpoints manually (e.g., in response to a user manually initiating the checkpointing process) or to capture checkpoints automatically on a periodic basis (e.g., every Wednesday at 1:00 AM, etc.). Periodic checkpoints are arbitrary as the passage of time is not always a good indicator of the amount of changes that have occurred on the device, and manual checkpointing is prone to error and user fatigue as people may become annoyed with (or forget to) capture checkpoints to back up their mobile devices.

The various aspects overcome these and other limitations of existing solutions by providing methods, systems, and devices configured to capture checkpoints continuously or near continuously without significantly impacting the responsiveness, performance, or power consumption characteristics of the mobile device, intelligently determine what factors or features should be included in each checkpoint, and/or intelligently determine when a checkpoint should be stored or uploaded to a network server. The various aspects may capture and upload checkpoints as part of a comprehensive behavior analysis solution implemented in the mobile device.

Various aspects may include network servers, mobile devices, systems, and methods for efficiently identifying, classifying, modeling, preventing, and/or correcting the conditions and/or mobile device behaviors that often degrade a mobile device's performance and/or power utilization levels over time.

In an aspect, an observer process, daemon, module, or sub-system (herein collectively referred to as a "module") of the mobile device may instrument or coordinate various application programming interfaces (APIs) at various levels of the mobile device system, and collect behavior information from the instrumented APIs. The observer module may constantly monitor the mobile device (via a low power process, background processes, etc.) to identify the normal operation patterns of the mobile device and/or to identify behaviors that are not consistent with previously computed normal operation patterns. The observer module may communicate (e.g., via a memory write operation, function call, etc.) the collected behavior information to the analyzer module (e.g., via a memory write operation, etc.) of the mobile device, which may analyze and/or classify the collected behavior information, generate behavior vectors, generate spatial and/or temporal correlations based on the behavior vector and information collected from various other mobile device sub-systems, and determine whether a particular mobile device behavior, software application, or process is benign, suspicious, or malicious/performance-degrading.

In an aspect, a mobile device may be configured to use the results of the above mentioned behavior analysis techniques to intelligently and autonomously perform checkpointing operations. In this manner, a mobile device configured according to an aspect may take and store a snapshot of the system state to generate a checkpoint when detected device behaviors are normal, but only upload the stored checkpoint to a backup storage system in response to determining that the mobile device behaviors are not consistent with normal operation patterns. For example, the mobile device may be configured to generating a checkpoint that includes information collected by the observer module when it recognizes normal operation patterns of the mobile device. By generating the checkpoint using information previously collected by the observer module, the mobile device may be relieved from a significant number of additional processor or battery intensive operations associated with checkpointing. In this manner, various aspects may capture checkpoints frequently without consuming any or a significant number of the mobile device's processing or battery resources.

In an aspect, the mobile device may be configured to capture checkpoints continuously or frequently while operating behavior patterns are normal, and store each checkpoint in a local memory or cache, such as by overwriting checkpoints previously stored in the local memory or cache. This process or updating the locally-stored checkpoint may continue so long as the mobile device behaviors are determined by the observer module to be within normal operating patterns. The mobile device may be further configured to automatically and immediately upload the latest locally-stored checkpoint to a backup storage repository, network server, or a server in a cloud computing network when the analyzer module determines that a mobile device behavior, software application, or process is operating in a manner that is suspicious or malicious, or exhibiting performance-degrading behavior.

By capturing checkpoints continuously (or frequently) so long as the mobile device behaviors are within normal operating patterns, the various aspects may ensure that the mobile device always maintains an updated checkpoint that includes the latest or most current information gathered before any suspicious or malicious behavior was detected. In addition, by uploading the locally stored checkpoint to a backup storage repository only when the mobile device determines that a particular mobile device behavior, software application, or process is potentially malicious or performance-degrading, the various aspects may reduce or minimize the number of checkpoint uploads, and thus the amount of information communicated over the network to the network server. Minimizing checkpoint uploads also conserves device resources (e.g., battery power, communication bandwidth, and processor availability), thereby improving the user experience even while providing a robust backup capability.

In an aspect, the mobile device may be configured to automatically capture a checkpoint in response to detecting the occurrence of an event or trigger. In an aspect, the mobile device may be configured to automatically upload a checkpoint stored in a local memory or cache in response to detecting the occurrence of an event or trigger. In an aspect, the analyzer module may be configured to automatically generate or activate a checkpointing trigger when the analyzer module determines that a particular mobile device behavior, software application, or process is suspicious or malicious/performance-degrading.

In various aspects, the mobile device may be configured to upload the cached checkpoints to the network server (e.g., a server in a cloud computing network, a backup storage repository, etc.) when the mobile device associates with a WiFi access point, when the mobile device is connected to a power source, or at other opportune times/situations.

In an aspect, the mobile device may be configured to automatically download the latest or most current checkpoint from the network server (e.g., sever in a cloud computing network, a backup storage repository, etc.) and use the downloaded checkpoint to restore the mobile device to a prior state or condition in which the mobile device is known to have operated in accordance with normal operation patterns. In an aspect, the mobile device may be configured to automatically download the last or latest checkpoint from the network server when the mobile device determines that a malicious or performance degrading mobile device behavior cannot be corrected or prevented.

In various aspects, the mobile device may be configured to generate a checkpoint that includes information relating to (or suitable for restoring) the entire mobile device, a system, a sub-system, a module, a specific software application, a process, etc. For example, the mobile device may be configured to capture a focused checkpoint that includes an image of a specific software application (as opposed to an image of the hard drive or the entire mobile device) and/or restore only the software or modules related to that particular software application or for restoring that application to its previous state (e.g., a state prior to installing the last software update for the software application, prior to opening a file in the application, etc.).

The various aspects may be implemented within a variety of communication systems, such as the example communication system 100 illustrated in FIG. 1. A typical cell telephone network 104 includes a plurality of cell base stations 106 coupled to a network operations center 108, which operates to connect voice calls and data between mobile devices 102 (e.g., cell phones, laptops, tablets, etc.) and other network destinations, such as via telephone land lines (e.g., a POTS network, not shown) and the Internet 110. Communications between the mobile devices 102 and the telephone network 104 may be accomplished via two-way wireless communication links 112, such as 4G, 3G, CDMA, TDMA, LTE, and/or other cell telephone communication technologies. The telephone network 104 may also include one or more servers 114 coupled to or within the network operations center 108 that provide a connection to the Internet 110.

The communication system 100 may further include network servers 116 connected to the telephone network 104 and to the Internet 110. The connection between the network server 116 and the telephone network 104 may be through the Internet 110 or through a private network (as illustrated by the dashed arrows). The network server 116 may also be implemented as a server within the network infrastructure of a cloud service provider network 118. Communications between the network server 116 and the mobile devices 102 may be achieved through the telephone network 104, the internet 110, private network (not illustrated), or any combination thereof.

The mobile device 102 may be configured to generate checkpoints and send the generated checkpoints to the network server 116 (e.g., via the telephone network 104) for analysis and/or storage. Likewise, the network server 116 may be configured to send the stored checkpoints to the mobile device 102, which may receive and use the checkpoints to restore the mobile device to a prior state or condition.

Figure 2:
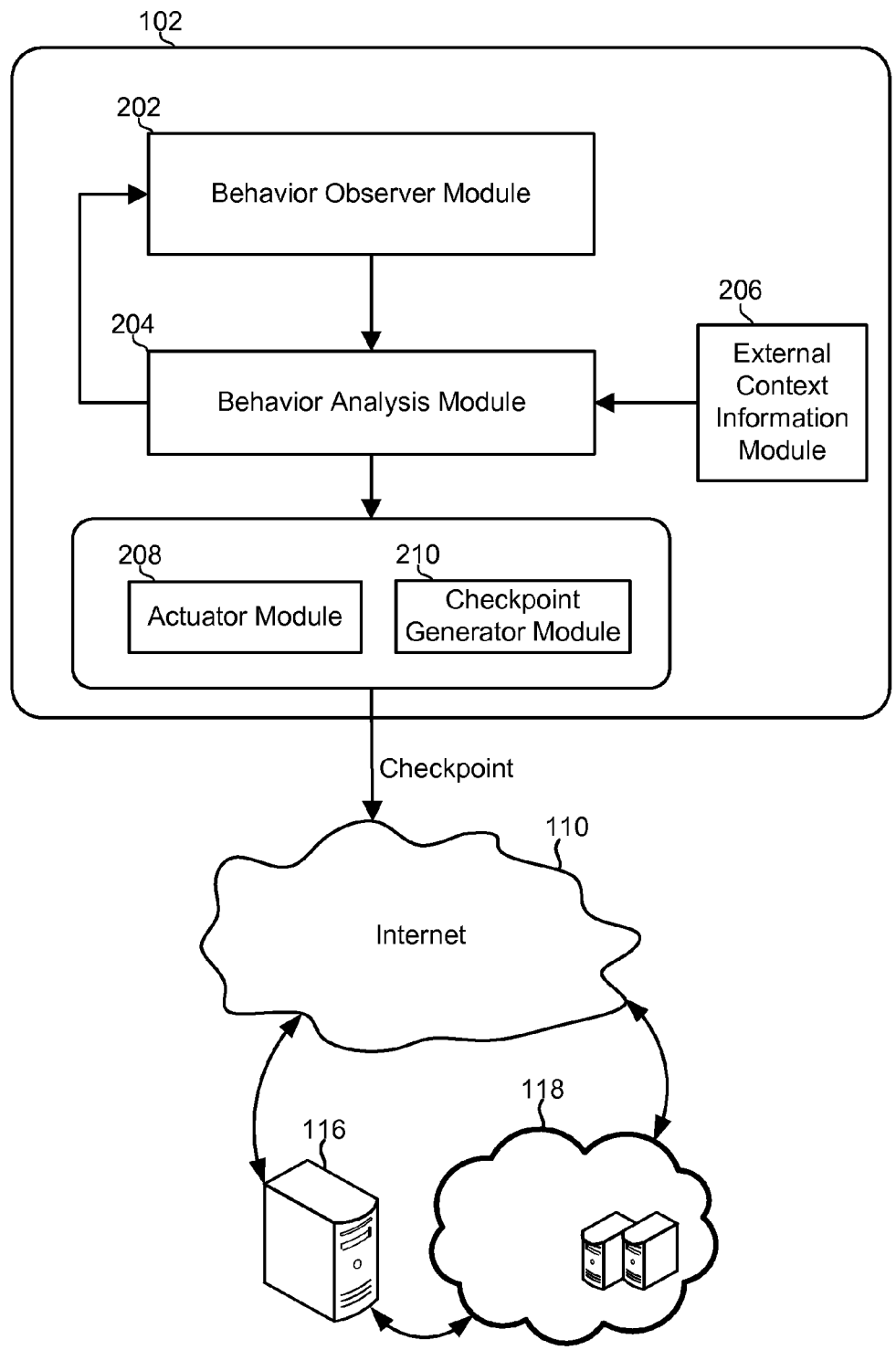
FIG. 2 is a block diagram illustrating example logical components and information flows in an aspect mobile device configured to determine whether a particular mobile device behavior, software application, or process is performance-degrading, suspicious, or benign.

FIG. 2 illustrates example logical components and information flows in an aspect mobile device 102 configured to determine whether a particular mobile device behavior, software application, or process is malicious/performance-degrading, suspicious, or benign. In the example illustrated in FIG. 2, the mobile device 102 includes a behavior observer module 202, a behavior analyzer module 204, an external context information module 206, an actuator module 208, and a checkpoint generator module 210. In an aspect, the checkpoint generator module 210 may be included as part of the actuator module 208.

Each of the modules 202-210 may be implemented in software, hardware, or any combination thereof. In various aspects, the modules 202-210 may be implemented within parts of the operating system (e.g., within the kernel, in the kernel space, in the user space, etc.), within separate programs or applications, in specialized hardware buffers or processors, or any combination thereof. In an aspect, one or more of the modules 202-210 may be implemented as software instructions executing on one or more processors of the mobile device 102.

The behavior observer module 202 may be configured to instrument or coordinate application programming interfaces (APIs) at various levels/modules of the mobile device, and monitor/observe mobile device operations and events (e.g., system events, state changes, etc.) at the various levels/modules via the instrumented APIs, collect information pertaining to the observed operations/events, intelligently filter the collected information, generate one or more observations based on the filtered information, and store the generated observations in a memory (e.g., in a log file, etc.) and/or send (e.g., via memory writes, function calls, etc.) the generated observations to the behavior analyzer module 204.

The behavior observer module 202 may monitor/observe mobile device operations and events by collecting information pertaining to library application programming interface (API) calls in an application framework or run-time libraries, system call APIs, file-system and networking sub-system operations, device (including sensor devices) state changes, and other similar events. The behavior observer module 202 may also monitor file system activity, which may include searching for filenames, categories of file accesses (personal info or normal data files), creating or deleting files (e.g., type exe, zip, etc.), file read/write/seek operations, changing file permissions, etc.

The behavior observer module 202 may also monitor data network activity, which may include types of connections, protocols, port numbers, server/client that the device is connected to, the number of connections, volume or frequency of communications, etc. The behavior observer module 202 may monitor phone network activity, which may include monitoring the type and number of calls or messages (e.g., SMS, etc.) sent out, received, or intercepted (e.g., the number of premium calls placed).

The behavior observer module 202 may also monitor the system resource usage, which may include monitoring the number of forks, memory access operations, number of files open, etc. The behavior observer module 202 may monitor the state of the mobile device, which may include monitoring various factors, such as whether the display is on or off, whether the device is locked or unlocked, the amount of battery remaining, the state of the camera, etc. The behavior observer module 202 may also monitor inter-process communications (IPC) by, for example, monitoring intents to crucial services (browser, contracts provider, etc.), the degree of inter-process communications, pop-up windows, etc.

To reduce the number of factors monitored to a manageable level, in an aspect, the behavior observer module 202 may perform coarse observations by monitoring/observing an initial set of behaviors or factors that are a small subset of all factors that could contribute to the mobile device's degradation. In an aspect, the behavior observer module 202 may receive the initial set of behaviors and/or factors from a network server 116 and/or a component in a cloud service provider network 118. In an aspect, the initial set of behaviors/factors may be specified in data/behavior models received from the network server 116 or cloud service provider network 118.

The behavior analyzer module 204 may receive the observations from the behavior observer module 202, compare the received information (i.e., observations) with contextual information received from the external context information module 206, and identify subsystems, processes, and/or applications associated with the received observations that are contributing to (or are likely to contribute to) the device's degradation over time, or which may otherwise cause problems on the device.

In an aspect, the behavior analyzer module 204 may include intelligence for utilizing a limited set of information (i.e., coarse observations) to identify behaviors, processes, or programs that are contributing to—or are likely to contribute to—the device's degradation over time, or which may otherwise cause problems on the device. For example, the behavior analyzer module 204 may be configured to analyze information (e.g., in the form of observations) collected from various modules (e.g., the behavior observer module 202, external context information module 206, etc.), learn the normal operational behaviors of the mobile device, generate one or more behavior vectors based the results of the comparisons, and compare the generated behavior vectors to other behavior modules to determine whether a particular mobile device behavior, software application, or process is performance-degrading/malicious, benign, or suspicious.

The behavior analyzer module 204 may notify the actuator module 208 and/or the checkpoint generator module 210 when the behavior analyzer module 204 determines that a behavior, software application, or process is suspicious, malicious or performance-degrading. The actuator module 208 may perform various actions or operations to correct mobile device behaviors determined to be malicious or performance-degrading and/or perform operations to heal, cure, isolate, or otherwise fix the identified problem.

In an aspect, the behavior observer module 202 and the behavior analyzer module 204 may provide, either individually or collectively, near continuous real-time behavior monitoring and analysis to identify suspicious behavior from limited and coarse observations, to dynamically determine behaviors to observe in greater detail, and to dynamically determine the level of detail required for the observations. In this manner, the mobile device 102 may efficiently identify and prevent problems from occurring on mobile devices without requiring a large amount of processor, memory, or battery resources on the device. Additionally, by conducting near continuous real-time behavior monitoring and analysis, the behavior observer module 202 and/or the behavior analyzer module 204 may determine when the mobile device behaviors are consistent with normal patterns.

In an aspect, the behavior analyzer module 204 may set a flag or otherwise indicate that the mobile device behaviors are currently within normal patterns. This information may be used by a checkpoint generator module 210 to determine that it may generate an updated checkpoint and store the new checkpoint in a local memory or cache. The generation of a checkpoint by the checkpoint generator module 210 may be based on a clock or other interval determining mechanism so that checkpoints are generated relatively frequently, while the flag or other indication of normal behavior patterns from the behavior analyzer module 204 may be used as permission for initiating a periodic update of the stored checkpoint.

In an aspect, the behavior analyzer module 204 may send a trigger alert message to cause a checkpoint generator module 210 to send the last/latest checkpoint stored in a local memory or cache to a network server 116 or cloud service provider network 118 (e.g., via the Internet 110) when the behavior analyzer module 204 determines that a behavior, software application, or process is suspicious, malicious or performance-degrading.

In various aspects, the behavior analyzer module 204 may be configured to send the trigger alert message in response to downloading, installation, or updating a software application on the mobile device 102. In an aspect, the behavior analyzer module 204 may be configured to send the trigger alert message when the source of the application (e.g., an application store) is unknown. In an aspect, the behavior analyzer module 204 may be configured to send the trigger alert message in response to executing or downloading an application or an application update that is not signed.

In an aspect, the behavior analyzer module 204 may be configured to send the trigger alert message when the mobile device is determine to be physically in a high entropy location (i.e., a place where user typically does not visit often). In an aspect, the behavior analyzer module 204 may be configured to send the trigger alert message in response to determining that user has attempted and failed to log into the system an "x" number of times or when it otherwise determines that someone is trying to hack into or steal the phone.

In an aspect, the behavior analyzer module 204 may be configured to send the trigger alert message when the mobile device behavior, power consumption, and/or application invocations are inconsistent with the normal operating patterns, which may be determined from historical operating information of the mobile device.

In an aspect, the behavior analyzer module 204 may be configured to send the trigger alert message in response to detecting the use or execution of specific software applications or types of software applications. For example, the behavior analyzer module 204 may be configured to send the trigger alert message in response to detecting the use or execution of a document creation application (e.g., Evernote, Quickoffice, etc.).

Figure 3A:
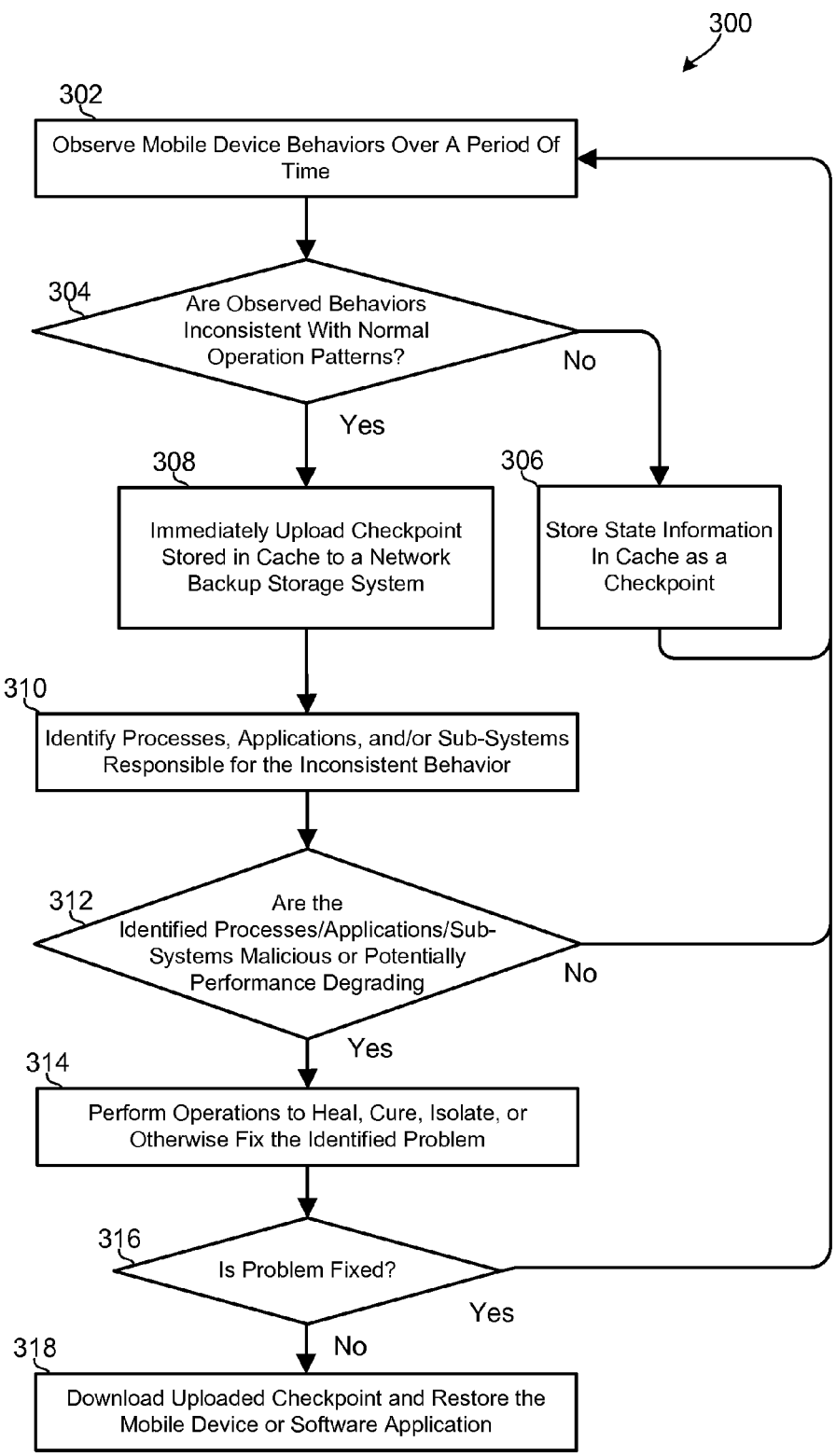
FIG. 3A is a process flow diagram illustrating an aspect mobile device method of automatically generating and reverting to checkpoints.

FIG. 3A illustrates an aspect mobile device method 300 of automatically generating and reverting to checkpoints. In block 302, a mobile device processor may observe mobile device behaviors over a period of time and collect behavior information suitable for use in identifying mobile device behaviors that are inconsistent with normal operation patterns. In determination block 304, the mobile device processor may determine whether the observed behaviors are inconsistent with normal operation patterns by applying data/behavior models to the collected behavior information to determine whether a mobile device behavior is suspicious or malicious/performance-degrading.

When the mobile device processor determines that the observed behaviors are consistent with normal operation patterns (i.e., determination block 304="No"), in block 306, the mobile device processor may store mobile device state information in a local memory as a stored checkpoint. In various aspects, the mobile device state information may include information for restoring the mobile device and/or one or more software applications of the mobile device to their current operating states or conditions. After a checkpoint is stored, the processor may return to observing mobile device behaviors in block 302 and the process may continue so long as observed behaviors are consistent with normal operation patterns (i.e., determination block 304="No").

When the mobile device processor determines that the observed behaviors are inconsistent with normal operation patterns (i.e., determination block 304="Yes"), in block 308, the mobile device processor may promptly upload the stored checkpoint to a backup storage system, such as a network server or a cloud service provider network.

In block 310, the mobile device processor may identify processes, applications, and/or sub-systems that are responsible for causing the inconsistent mobile device behavior. In determination block 312, the mobile device processor may determine whether the identified processes, applications, and/or sub-systems are malicious and/or potentially performance degrading. When the mobile device processor determines that the identified processes, applications, and/or sub-systems are not malicious or potentially performance degrading (i.e., determination block 312="No"), the mobile device processor may return to observing mobile device behaviors in block 302. On the other hand, if the mobile device processor determines that the identified processes, applications, and/or subsystems are malicious or potentially performance degrading (i.e., determination block 312="Yes"), in block 314, the mobile device processor may perform various actions or operations in an attempt to correct the mobile device behaviors determined to be malicious or performance-degrading. This may include performing operations to heal, cure, isolate, or otherwise fix the identified problem.

In determination block 316, the mobile device processor may determine whether the mobile device behaviors determined to be malicious or performance-degrading have been corrected and/or the identified problem has otherwise been fixed or cured. When the mobile device processor determines that the identified problem has been resolved (i.e., determination block 316="Yes"), the mobile device processor may return to observing mobile device behaviors in block 302. If the mobile device processor determines that identified problem has not been fixed (i.e., determination block 316="No"), in block 318, the mobile device processor may download the last uploaded checkpoint from the network backup storage system and perform operations for restoring the mobile device or a software application based on information included in the download checkpoint.

Figure 3B:
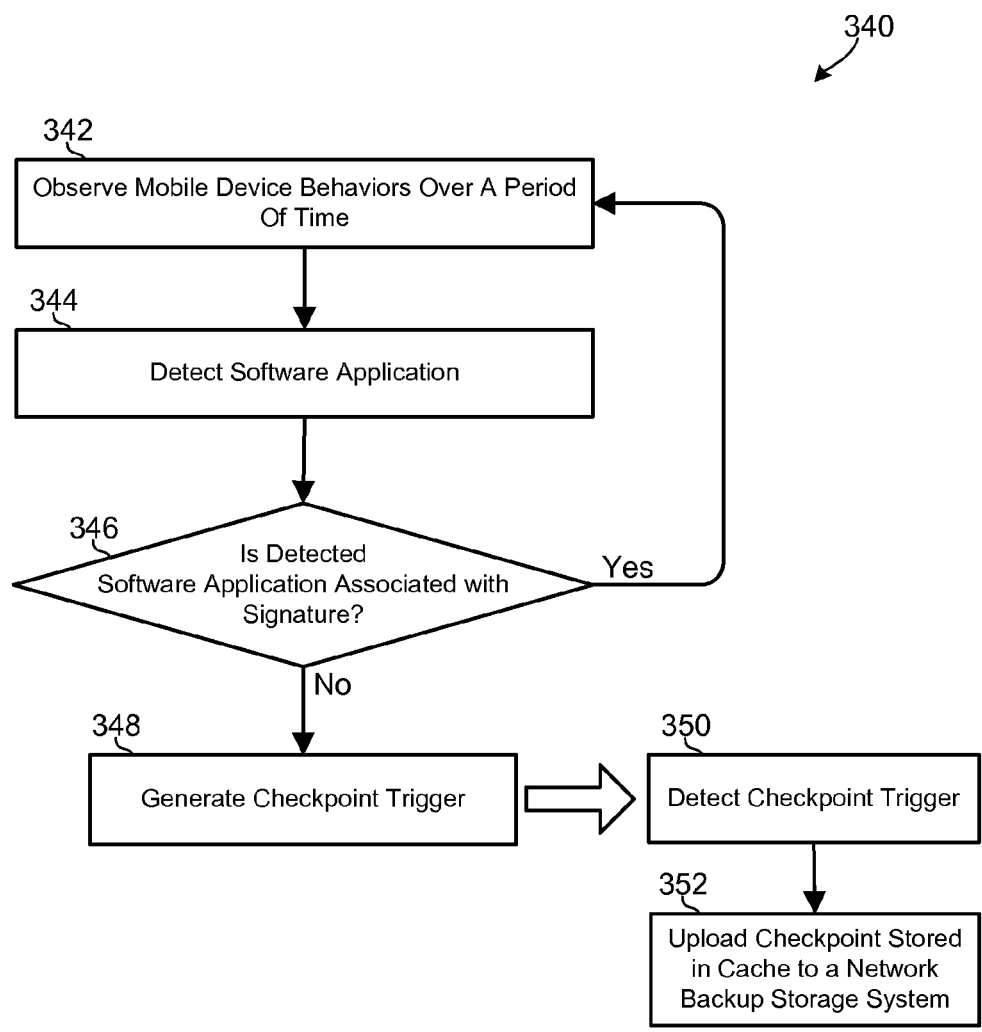
FIG. 3B is a process flow diagram illustrating an aspect mobile device method of storing mobile device state information in a memory as a stored checkpoint in response to detecting the occurrence of an event or a trigger.

FIG. 3B illustrates an example mobile device method 340 for uploading a stored checkpoint to a backup storage system in response to detecting the occurrence of an event or a trigger. In block 342, a first process executing in the mobile device processor may observe mobile device behaviors over a period of time and collect behavior information suitable for use in identifying mobile device behaviors that are inconsistent with normal operation patterns. In block 344, the mobile device processor may detect or determine that a new software application has begun executing in the mobile device processor.

In determination block 346, the mobile device processor may determine whether the software application is associated with a signature stored in the memory of the mobile device. When the mobile device processor determines that the software application is associated with a signature (i.e., determination block 346="Yes"), the mobile device processor may continue to observe mobile device behaviors in block 342. If the mobile device processor determines that the software application is not associated with a signature (i.e., determination block 346="No"), in block 348, the mobile device processor may generate a checkpoint trigger suitable for causing one or more modules of the computing device to upload a stored checkpoint to a backup storage system.

In block 350, a second process executing in the mobile device processor may detect the check point trigger. In block 350, the second process may access the stored checkpoint stored locally within mobile device and initiate an upload of the checkpoint to a backup storage system.

Figure 3C:
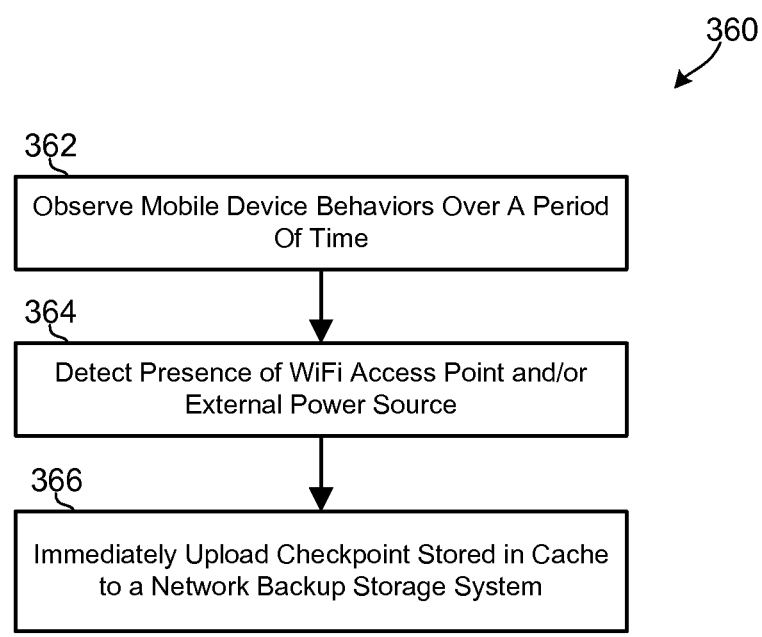
FIG. 3C is a process flow diagram illustrating aspect mobile device method of uploading a stored checkpoint to a backup storage system, such as a network server or a cloud service provider network, in response to detecting the presence of a component, resource or condition.

FIG. 3C illustrates an aspect mobile device method 360 of uploading a stored checkpoint to a backup storage system, such as a network server or a cloud service provider network, in response to detecting the presence of a component, resource or condition. In block 362, a mobile device processor may observe mobile device behaviors over a period of time and collect behavior information suitable for use in identifying mobile device behaviors that are inconsistent with normal operation patterns. In block 364, the mobile device processor may detect the presence of an external component, such as a WiFi access point, or determine that a new resource is available, such as an external power source. For example, in block 364, the mobile device processor may determine that a high bandwidth and/or low cost network connection is available via a WiFi Access Point or that the mobile device has been connected to a wired power socket (i.e., new resources are available). In block 366, the mobile device processor may immediately upload the stored checkpoint to a backup storage system, such as a network server or a cloud service provider network.

Figure 4:
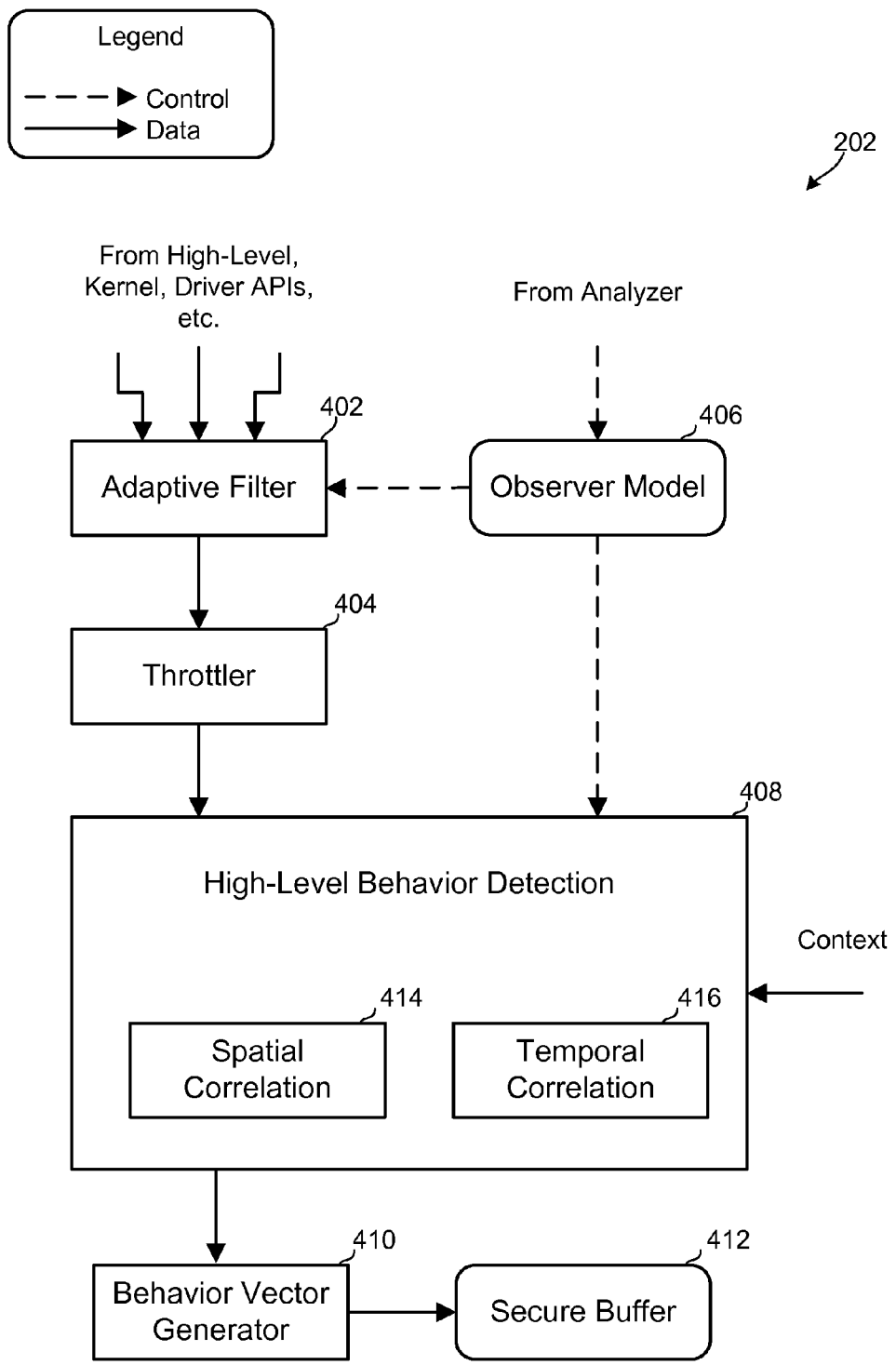
FIG. 4 is a block diagram illustrating example logical components and information flows in an observer module configured to perform dynamic and adaptive observations to generate information suitable for use in generating a checkpoint in accordance with an aspect.

FIG. 4 illustrates example logical components and information flows in a behavior observer module 202 of a computing system configured to perform dynamic and adaptive observations in accordance with an aspect. The behavior observer module 202 may include an adaptive filter module 402, a throttle module 404, an observer mode module 406, a high-level behavior detection module 408, a behavior vector generator 410, and a secure buffer 412. The high-level behavior detection module 408 may include a spatial correlation module 414 and a temporal correlation module 416.

The observer mode module 406 may receive control information from various sources, which may include an analyzer unit (e.g., the behavior analyzer module 204 described above with reference to FIG. 2) and/or an application API. The observer mode module 406 may send control information pertaining to various observer modes to the adaptive filter module 402 and the high-level behavior detection module 408.

The adaptive filter module 402 may receive data/information from multiple sources, and intelligently filter the received information to generate a smaller subset of information selected from the received information. This filter may be adapted based on information or control received from the analyzer module, or a higher-level process communicating through an API. The filtered information may be sent to the throttle module 404, which may be responsible for controlling the amount of information flowing from the filter to ensure that the high-level behavior detection module 408 does not become flooded or overloaded with requests or information.

The high-level behavior detection module 408 may receive data/information from the throttle module 404, control information from the observer mode module 406, and context information from other components of the mobile device. The high-level behavior detection module 408 may use the received information to perform spatial and temporal correlations to detect or identify high level behaviors that may cause the device to perform at sub-optimal levels. The results of the spatial and temporal correlations may be sent to the behavior vector generator 410, which may receive the correlation information and generate a behavior vector that describes the behaviors of particular process, application, or sub-system. In an aspect, the behavior vector generator 410 may generate the behavior vector such that each high-level behavior of a particular process, application, or sub-system is an element of the behavior vector. In an aspect, the generated behavior vector may be stored in a secure buffer 412. Examples of high-level behavior detection may include detection of the existence of a particular event, the amount or frequency of another event, the relationship between multiple events, the order in which events occur, time differences between the occurrence of certain events, etc.

In the various aspects, the behavior observer module 202 may perform adaptive observations and control the observation granularity. That is, the behavior observer module 202 may dynamically identify the relevant behaviors that are to be observed, and dynamically determine the level of detail at which the identified behaviors are to be observed. In this manner, the behavior observer module 202 enables the system to monitor the behaviors of the mobile device at various levels (e.g., multiple coarse and fine levels). The behavior observer module 202 may enable the system to adapt to what is being observed. The behavior observer module 202 may enable the system to dynamically change the factors/behaviors being observed based on a focused subset of information, which may be obtained from a wide verity of sources.

As discussed above, the behavior observer module 202 may perform adaptive observation techniques, and control the observation granularity based on information received from a variety of sources. For example, the high-level behavior detection module 408 may receive information from the throttle module 404, the observer mode module 406, and context information received from other components (e.g., sensors) of the mobile device. As an example, a high-level behavior detection module 408 performing temporal correlations might detect that a camera has been used and that the mobile device is attempting to upload the picture to a server. The high-level behavior detection module 408 may also perform spatial correlations to determine whether an application on the mobile device took the picture while the device was holstered and attached to the user's belt. The high-level behavior detection module 408 may determine whether this detected high-level behavior (e.g., usage of the camera while holstered) is a behavior that is acceptable or common, which may be achieved by comparing the current behavior with past behaviors of the mobile device and/or accessing information collected from a plurality of devices (e.g., information received from a crowd-sourcing server). Since taking pictures and uploading them to a server while holstered is an unusual behavior (as may be determined from observed normal behaviors in the context of being holstered), in this situation the high-level behavior detection module 408 may recognize this as a potentially threatening behavior and initiate an appropriate response (e.g., shutting off the camera, sounding an alarm, etc.).

In an aspect, the behavior observer module 202 may be implemented in multiple parts.

Figure 5:
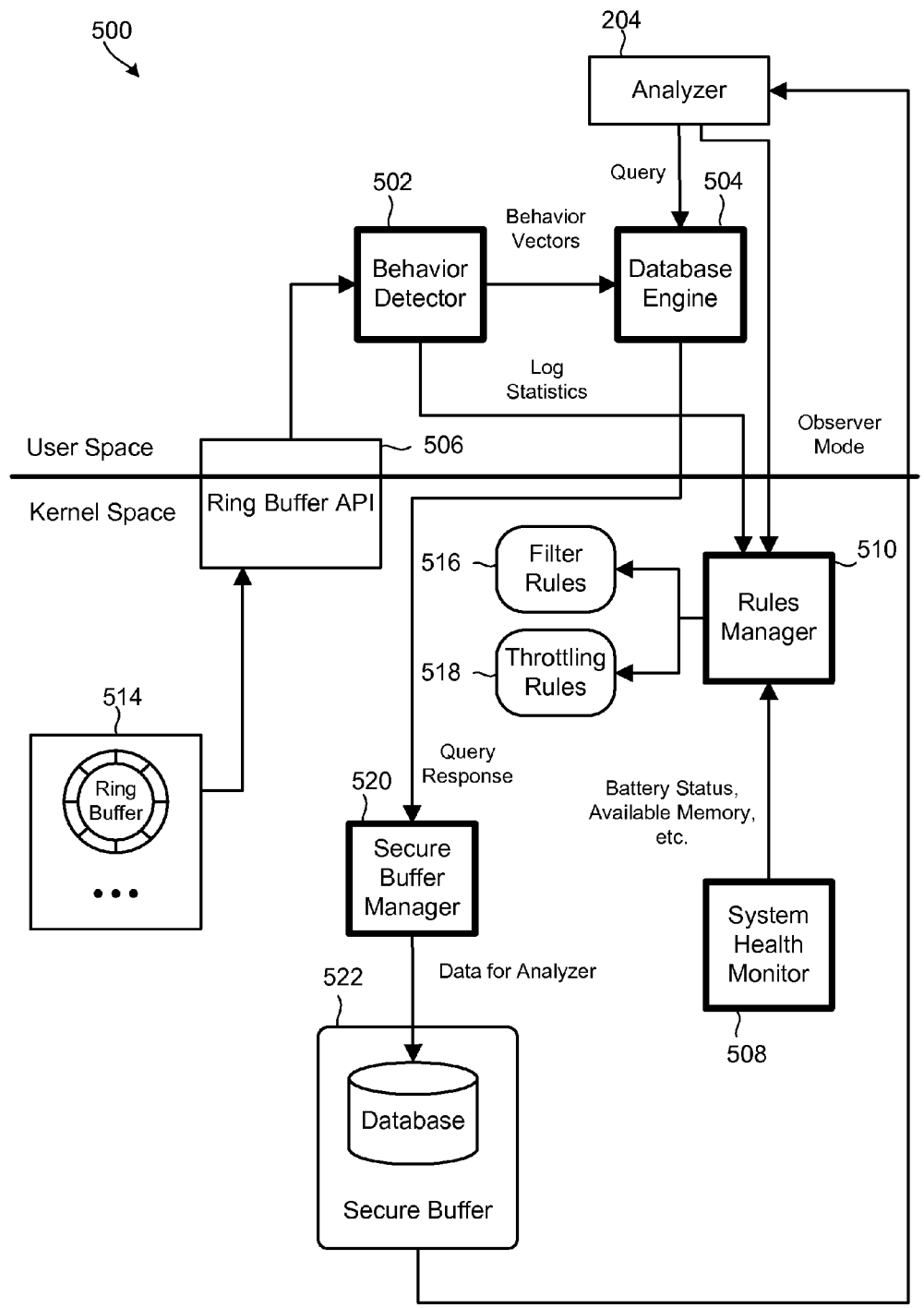
FIG. 5 is a block diagram illustrating logical components and information flows in a computing system implementing observer daemons in accordance with an aspect.

FIG. 5 illustrates logical components and information flows in a computing system 500 implementing an aspect observer daemon. In the example illustrated in FIG. 5, the computing system 500 includes a behavior detector 502 module, a database engine 504 module, and an behavior analyzer module 204 in the user space, and a ring buffer 514, a filter rules 516 module, a throttling rules 518 module, a secure buffer manager 520, and a secure buffer 522 in the kernel space. The computing system 500 may further include an observer daemon that includes the behavior detector 502 and the database engine 504 in the user space, and the secure buffer manager 520, the rules manager 510, and the system health monitor 508 in the kernel space. The computing system 500 may further include a ring buffer API 506 for communicating information stored in the ring buffer 514 to the behavior detector 502 module.

The various aspects may provide cross-layer observations on mobile devices encompassing webkit, SDK, NDK, kernel, drivers, and hardware in order to characterize system behavior. The behavior observations may be made in real time.

The observer module may perform adaptive observation techniques and control the observation granularity. As discussed above, there are a large number (i.e., thousands) of factors that could contribute to the mobile device's degradation, and it may not be feasible to monitor/observe all of the different factors that may contribute to the degradation of the device's performance. To overcome this, the various aspects dynamically identify the relevant behaviors that are to be observed, and dynamically determine the level of detail at which the identified behaviors are to be observed.

Figure 6:
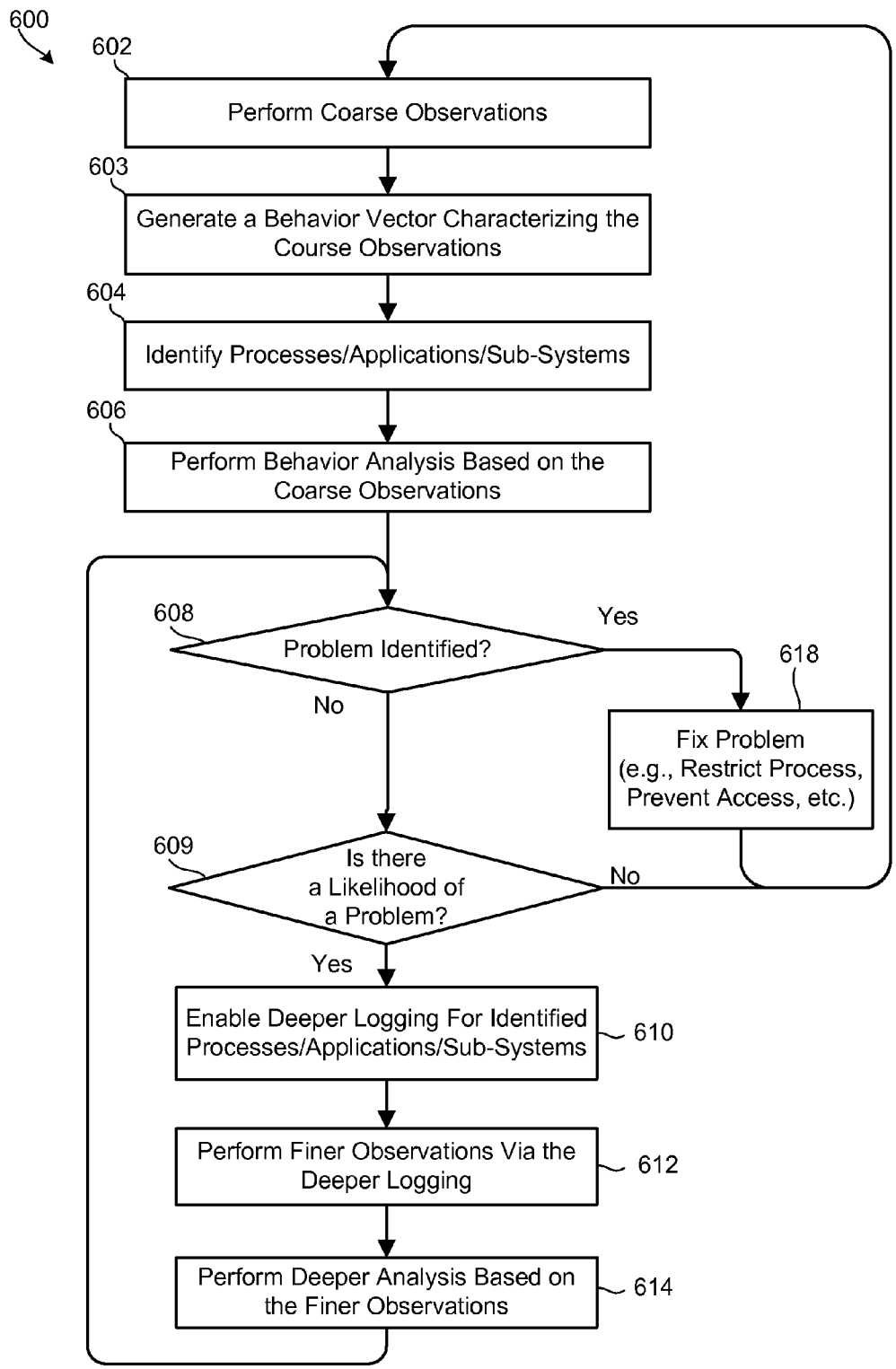
FIG. 6 is a process flow diagram illustrating an aspect method for performing adaptive observations on mobile devices.

FIG. 6 illustrates an example method 600 for performing dynamic and adaptive observations in accordance with an aspect. In block 602, the mobile device processor may perform coarse observations by monitoring/observing a subset of large number factors/behaviors that could contribute to the mobile device's degradation. In block 603, the mobile device processor may generate a behavior vector characterizing the coarse observations and/or the mobile device behavior based on the coarse observations. In block 604, the mobile device processor may identify subsystems, processes, and/or applications associated with the coarse observations that may potentially contribute to the mobile device's degradation. This may be achieved, for example, by comparing information received from multiple sources with contextual information received from sensors of the mobile device. In block 606, the mobile device processor may perform behavioral analysis operations based on the coarse observations. In an aspect, as part of blocks 603 and 604, the mobile device processor may perform one or more of the operations discussed above with reference to FIG. 3.

In determination block 608, the mobile device processor may determine whether suspicious behaviors or potential problems can be identified and corrected based on the results of the behavioral analysis. When the mobile device processor determines that the suspicious behaviors or potential problems can be identified and corrected based on the results of the behavioral analysis (i.e., determination block 608="Yes"), in block 618, the processor may initiate a process to correct the behavior and return to block 602 to perform additional coarse observations.

When the mobile device processor determines that the suspicious behaviors or potential problems cannot be identified and/or corrected based on the results of the behavioral analysis (i.e., determination block 608="No"), in determination block 609 the mobile device processor may determine whether there is a likelihood of a problem. In an aspect, the mobile device processor may determine that there is a likelihood of a problem by computing a probability of the mobile device encountering potential problems and/or engaging in suspicious behaviors, and determining whether the computed probability is greater than a predetermined threshold. When the mobile device processor determines that the computed probability is not greater than the predetermined threshold and/or there is not a likelihood that suspicious behaviors or potential problems exist and/or are detectable (i.e., determination block 609="No"), the processor may return to block 602 to perform additional coarse observations.

When the mobile device processor determines that there is a likelihood that suspicious behaviors or potential problems exist and/or are detectable (i.e., determination block 609="Yes"), in block 610, the mobile device processor may perform deeper logging/observations or final logging on the identified subsystems, processes or applications. In block 612, the mobile device processor may perform deeper and more detailed observations on the identified subsystems, processes or applications. In block 614, the mobile device processor may perform further and/or deeper behavioral analysis based on the deeper and more detailed observations. In determination block 608, the mobile device processor may again determine whether the suspicious behaviors or potential problems can be identified and corrected based on the results of the deeper behavioral analysis. When the mobile device processor determines that the suspicious behaviors or potential problems cannot be identified and corrected based on the results of the deeper behavioral analysis (i.e., determination block 608="No"), the processor may repeat the operations in blocks 610-614 until the level of detail is fine enough to identify the problem or until it is determined that the problem cannot be identified with additional detail or that no problem exists.

When the mobile device processor determines that the suspicious behaviors or potential problems can be identified and corrected based on the results of the deeper behavioral analysis (i.e., determination block 608="Yes"), in block 618, the mobile device processor may perform operations to correct the problem/behavior, and the processor may return to block 602 to perform additional operations.

In an aspect, as part of blocks 602-618 of method 600, the mobile device processor may perform real-time behavior analysis of the system's behaviors to identify suspicious behavior from limited and coarse observations, to dynamically determine the behaviors to observe in greater detail, and to dynamically determine the precise level of detail required for the observations. This enables the mobile device processor to efficiently identify and prevent problems from occurring, without requiring the use of a large amount of processor, memory, or battery resources on the device.

Figure 7:
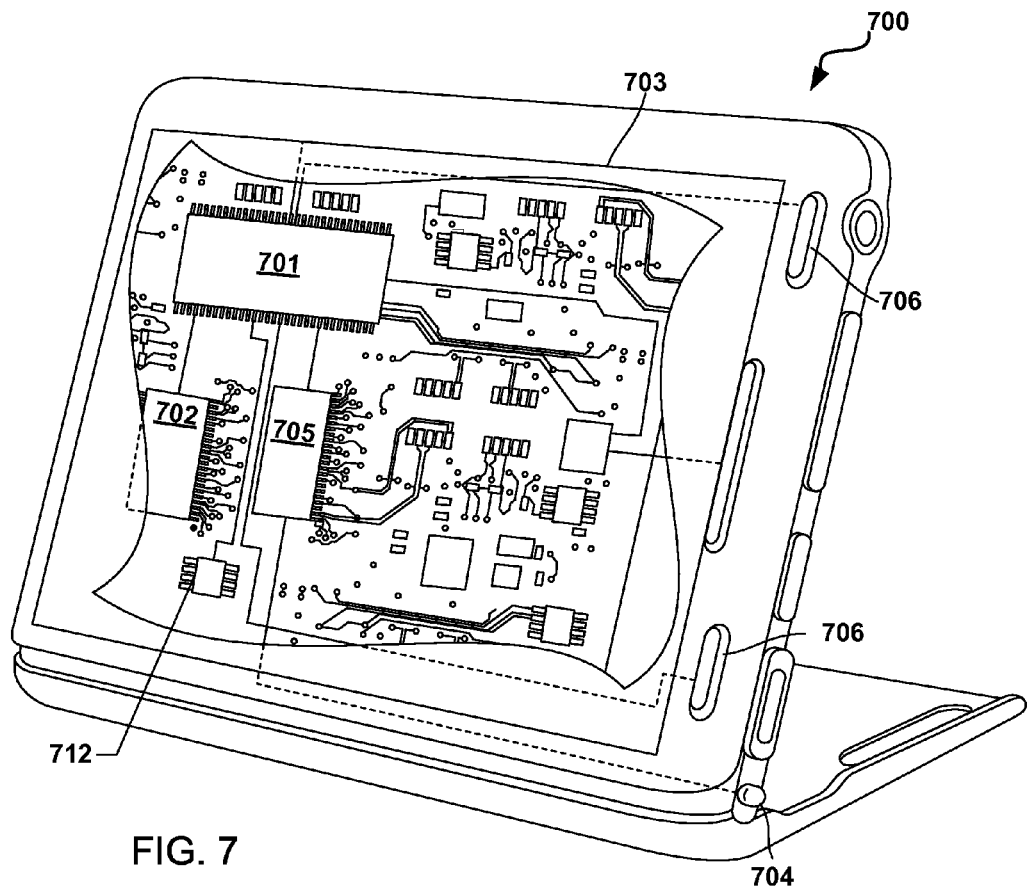
FIG. 7 is a component block diagram of a mobile device suitable for use in an aspect.

The various aspects may be implemented on a variety of mobile computing devices, an example of which is illustrated in FIG. 7 in the form of a smartphone. A smartphone 700 may include a processor 701 coupled to internal memory 702, a display 703, and to a speaker. Additionally, the smartphone 700 may include an antenna 704 for sending and receiving electromagnetic radiation that may be connected to a wireless data link and/or cellular telephone transceiver 705 coupled to the processor 701. Smartphones 700 typically also include menu selection buttons or rocker switches 706 for receiving user inputs.

A typical smartphone 700 also includes a sound encoding/decoding (CODEC) circuit 712, which digitizes sound received from a microphone into data packets suitable for wireless transmission and decodes received sound data packets to generate analog signals that are provided to the speaker to generate sound. Also, one or more of the processor 701, wireless transceiver 705 and CODEC 712 may include a digital signal processor (DSP) circuit (not shown separately).

Figure 8:
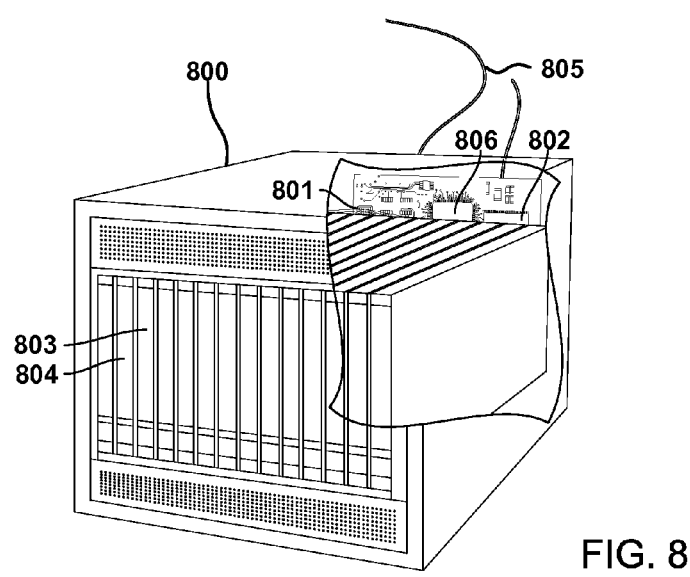
FIG. 8 is a component block diagram of a server device suitable for use in an aspect.

Portions of the aspect methods may be accomplished in a client-server architecture with some of the processing occurring in a server, such as maintaining databases of normal operational behaviors, which may be accessed by a mobile device processor while executing the aspect methods. Such aspects may be implemented on any of a variety of commercially available server devices, such as the server 800 illustrated in FIG. 8. Such a server 800 typically includes a processor 801 coupled to volatile memory 802 and a large capacity nonvolatile memory, such as a disk drive 803. The server 800 may also include a floppy disc drive, compact disc (CD) or DVD disc drive 804 coupled to the processor 801. The server 800 may also include network access ports 806 coupled to the processor 801 for establishing data connections with a network 805, such as a local area network coupled to other broadcast system computers and servers.

The processors 701, 801 may be any programmable microprocessor, microcomputer or multiple processor chip or chips that can be configured by software instructions (applications) to perform a variety of functions, including the functions of the various aspects described below. In some mobile devices, multiple processors 701 may be provided, such as one processor dedicated to wireless communication functions and one or more processors dedicated to running other applications. Typically, software applications may be stored in the internal memory 702, 802, 803 before they are accessed and loaded into the processor 701, 801. The processor 701, 801 may include internal memory sufficient to store the application software instructions.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of checkpointing in a mobile device, comprising:
    observing a mobile device behavior over a period of time to collect behavior information;
    using the collected behavior information to generate a behavior vector that includes a plurality of elements that collectively characterize the observed mobile device behavior;
    applying a behavior model to the generated behavior vector to generate an analysis result;
    using the generated analysis result to determine whether the observed mobile device behavior is not consistent with normal operation patterns of the mobile device;
    storing mobile device state information in a memory as a stored checkpoint in response to determining that the observed mobile device behavior is consistent with the normal operation patterns of the mobile device; and
    uploading the stored checkpoint to a backup storage system in response to determining that the observed mobile device behavior is not consistent with the normal operation patterns.

2. The method of claim 1, wherein storing the mobile device state information in the memory as the stored checkpoint comprises storing state information for restoring the mobile device as the stored checkpoint.

3. The method of claim 1, wherein storing the mobile device state information in the memory as the stored checkpoint comprises storing state information for restoring a specific software application as the stored checkpoint.

4. The method of claim 1, further comprising:
    determining whether a software application is associated with a signature; and
    generating a checkpoint trigger in response to determining that the software application is not associated with the signature.

5. The method of claim 1, further comprising:
    uploading the stored checkpoint to the backup storage system in response detecting a trigger generated in response to installing a software application update on the mobile device.

6. The method of claim 1, wherein uploading the stored checkpoint to the backup storage system comprises uploading the stored checkpoint to a server in a cloud service provider network.

7. The method of claim 1, further comprising:
    determining whether the mobile device is associated with a WiFi access point; and
    uploading the stored checkpoint to a network server in response to determining that the mobile device is associated with the WiFi access point.

8. The method of claim 1, further comprising:
    determining whether the mobile device is connected to an external power source; and
    uploading the stored checkpoint to a network server in response to determining that the mobile device is connected to the external power source.

9. A mobile computing device, comprising:
    means for observing a mobile device behavior over a period of time to collect behavior information;
    means for using the collected behavior information to generate a behavior vector that includes a plurality of elements that collectively characterize the observed mobile device behavior;
    means for applying a behavior model to the generated behavior vector to generate an analysis result;
    means for using the generated analysis result to determine whether the observed mobile device behavior is not consistent with normal operation patterns;
    means for storing mobile device state information in a memory as a stored checkpoint in response to determining that the observed mobile device behavior is consistent with the normal operation patterns of the mobile computing device; and
    means for uploading the stored checkpoint to a backup storage system in response to determining that the observed mobile device behavior is not consistent with the normal operation patterns.

10. The mobile computing device of claim 9, wherein means for storing the mobile device state information in the memory as the stored checkpoint comprises means for storing state information for restoring the mobile computing device as the stored checkpoint.

11. The mobile computing device of claim 9, wherein means for storing the mobile device state information in the memory as the stored checkpoint comprises means for storing state information for restoring a specific software application as the stored checkpoint.

12. The mobile computing device of claim 9, further comprising:
    means for determining whether a software application is associated with a signature; and
    means for generating a checkpoint trigger in response to determining that the software application is not associated with the signature.

13. The mobile computing device of claim 9, further comprising:
    means for uploading the stored checkpoint to the backup storage system in response detecting a trigger generated in response to installing a software application update on the mobile computing device.

14. The mobile computing device of claim 9, wherein means for uploading the stored checkpoint to the backup storage system comprises means for uploading the stored checkpoint to a server in a cloud service provider network.

15. The mobile computing device of claim 9, further comprising:
  means for determining whether the mobile computing device is associated with a WiFi access point; and
  means for uploading the stored checkpoint to a network server in response to determining that the mobile computing device is associated with the WiFi access point.

16. The mobile computing device of claim 9, further comprising:
  means for determining whether the mobile computing device is connected to an external power source; and
  means for uploading the stored checkpoint to a network server in response to determining that the mobile computing device is connected to the external power source.

17. A mobile computing device, comprising:
  a processor configured with processor-executable instructions to perform operations comprising:
    observing a mobile device behavior over a period of time to collect behavior information;
    using the collected behavior information to generate a behavior vector that includes a plurality of elements that collectively characterize the observed mobile device behavior;
    applying a behavior model to the generated behavior vector to generate an analysis result;
    using the generated analysis result to determine whether the observed mobile device behavior is not consistent with normal operation patterns of the mobile computing device;
    storing mobile device state information in a memory as a stored checkpoint in response to determining that the observed mobile device behavior is consistent with the normal operation patterns of the mobile computing device; and
    uploading the stored checkpoint to a backup storage system in response to determining that the observed mobile device behavior is not consistent with the normal operation patterns.

18. The mobile computing device of claim 17, wherein the processor is configured with processor-executable instructions to perform operations such that storing the mobile device state information in the memory as the stored checkpoint comprises storing state information for restoring the mobile computing device as the stored checkpoint.

19. The mobile computing device of claim 17, wherein the processor is configured with processor-executable instructions to perform operations such that storing the mobile device state information in the memory as the stored checkpoint comprises storing state information for restoring a specific software application as the stored checkpoint.

20. The mobile computing device of claim 17, wherein the processor is configured with processor-executable instructions to perform operations further comprising:
  determining whether a software application is associated with a signature; and
  generating a checkpoint trigger in response to determining that the software application is not associated with the signature.

21. The mobile computing device of claim 17, wherein the processor is configured with processor-executable instructions to perform operations such that further comprising:
  uploading the stored checkpoint in response detecting a trigger generated in response to installing a software application update on the mobile computing device.

22. The mobile computing device of claim 17, wherein the processor is configured with processor-executable instructions to perform operations such that uploading the stored checkpoint to the backup storage system comprises uploading the stored checkpoint to a server in a cloud service provider network.

23. The mobile computing device of claim 17, wherein the processor is configured with processor-executable instructions to perform operations further comprising:
  determining whether the mobile computing device is associated with a WiFi access point; and
  uploading the stored checkpoint to a network server in response to determining that the mobile computing device is associated with the WiFi access point.

24. The mobile computing device of claim 17, wherein the processor is configured with processor-executable instructions to perform operations further comprising:
  determining whether the mobile computing device is connected to an external power source; and
  uploading the stored checkpoint to a network server in response to determining that the mobile computing device is connected to the external power source.

25. A non-transitory computer readable storage medium having stored thereon processor-executable software instructions configured to cause a processor to perform operations for checkpointing in a mobile device, the operations comprising:
  observing a mobile device behavior over a period of time to collect behavior information;
  using the collected behavior information to generate a behavior vector that includes a plurality of elements that collectively characterize the observed mobile device behavior;
  applying a behavior model to the generated behavior vector to generate an analysis result;
  using the generated analysis result to determine whether the observed mobile device behavior is not consistent with normal operation patterns;
  storing mobile device state information in a memory as a stored checkpoint in response to determining that the observed mobile device behavior is consistent with the normal operation patterns of the mobile device; and
  uploading the stored checkpoint to a backup storage system in response to determining that the observed mobile device behavior is not consistent with the normal operation patterns.

26. The non-transitory computer readable storage medium of claim 25, wherein the stored processor-executable software instructions are configured to cause a processor to perform operations such that storing the mobile device state information in the memory as the stored checkpoint comprises storing state information for restoring the mobile device as the stored checkpoint.

27. The non-transitory computer readable storage medium of claim 25, wherein the stored processor-executable software instructions are configured to cause a processor to perform operations such that storing the mobile device state information in the memory as the stored checkpoint comprises storing state information for restoring a specific software application as the stored checkpoint.

28. The non-transitory computer readable storage medium of claim 25, wherein the stored processor-executable software instructions are configured to cause a processor to perform operations further comprising:
  determining whether a software application is associated with a signature; and
  generating a checkpoint trigger in response to determining that the software application is not associated with the signature.

29. The non-transitory computer readable storage medium of claim 25, wherein the stored processor-executable software instructions are configured to cause a processor to perform operations further comprising:
    uploading the stored checkpoint in response detecting a trigger generated in response to installing a software application update on the mobile device.

30. The non-transitory computer readable storage medium of claim 25, wherein the stored processor-executable software instructions are configured to cause a processor to perform operations such that uploading the stored checkpoint to the backup storage system comprises uploading the stored checkpoint to a server in a cloud service provider network.

31. The non-transitory computer readable storage medium of claim 25, wherein the stored processor-executable software instructions are configured to cause a processor to perform operations further comprising:
    determining whether the mobile device is associated with a WiFi access point; and
    uploading the stored checkpoint to a network server in response to determining that the mobile device is associated with the WiFi access point.

32. The non-transitory computer readable storage medium of claim 25, wherein the stored processor-executable software instructions are configured to cause a processor to perform operations further comprising:
    determining whether the mobile device is connected to an external power source; and
    uploading the stored checkpoint to a network server in response to determining that the mobile device is connected to the external power source.

* * * * *